United States Patent
Duselis et al.

(10) Patent No.: US 8,993,462 B2
(45) Date of Patent: Mar. 31, 2015

(54) SURFACE SEALED REINFORCED BUILDING ELEMENT

(75) Inventors: Steven Alfred Duselis, New South Wales (AU); James Gleeson, New South Wales (AU); Tihomir Kascelan, New South Wales (AU); David Lyons, New South Wales (AU); Milton Terrence O'Chee, New South Wales (AU)

(73) Assignee: James Hardie Technology Limited, Dublin (IE)

( * ) Notice: Subject to any disclaimer, the term of this patent is extended or adjusted under 35 U.S.C. 154(b) by 949 days.

(21) Appl. No.: 12/296,764

(22) PCT Filed: Apr. 12, 2007

(86) PCT No.: PCT/AU2007/000487
§ 371 (c)(1),
(2), (4) Date: Apr. 10, 2009

(87) PCT Pub. No.: WO2007/115379
PCT Pub. Date: Oct. 18, 2007

(65) Prior Publication Data
US 2009/0272058 A1 Nov. 5, 2009

(30) Foreign Application Priority Data
Apr. 12, 2006 (AU) ................... 2006901936

(51) Int. Cl.
*B32B 17/04* (2006.01)
*B32B 17/00* (2006.01)
(Continued)

(52) U.S. Cl.
CPC . *E04C 2/26* (2013.01); *B32B 13/02* (2013.01); *B32B 13/14* (2013.01); *B32B 17/04* (2013.01);
(Continued)

(58) Field of Classification Search
CPC .......... B32B 17/04; B32B 27/04; B32B 7/00; B32B 7/12; B32B 7/02; B29C 65/5021
USPC ............... 52/409, 411; 428/142; 442/86, 131, 442/132, 152, 164, 180
See application file for complete search history.

(56) References Cited

U.S. PATENT DOCUMENTS

| 369,216 A | 8/1887 | Temple |
|---|---|---|
| 494,763 A | 4/1893 | Smidth |

(Continued)

FOREIGN PATENT DOCUMENTS

| AR | 151553 | 10/1966 |
|---|---|---|
| AR | 206788 | 8/1976 |

(Continued)

OTHER PUBLICATIONS

World Minerals Corporation, "Celite Products" http://www.worldminerals.com/celite.html; 2006, 1 pg.

(Continued)

*Primary Examiner* — Phi A
(74) *Attorney, Agent, or Firm* — Knobbe, Martens, Olson & Bear, LLP

(57) ABSTRACT

A building element (1) that is suitable for use as a structural element in wet areas or external docking. The building element (1) comprises a rigid substrate (2) having an upper face (3). Over the first face (3) lies a radiation curable resin (4) into which a layer of reinforcing material (5) is at least partially embedded. The reinforcing material (5) and resin (3) can be applied separately or together onto the first face (3) of the rigid substrate (2) or in some cases can be applied to both faces. An apparatus and method for producing the building sheet are also disclosed.

29 Claims, 5 Drawing Sheets

(51) Int. Cl.
*E04C 2/26* (2006.01)
*B32B 13/02* (2006.01)
*B32B 13/14* (2006.01)
*B32B 37/00* (2006.01)
*B32B 7/12* (2006.01)
*B32B 7/02* (2006.01)
*B32B 37/24* (2006.01)

(52) U.S. Cl.
CPC . *B32B 37/00* (2013.01); *B32B 7/12* (2013.01); *B32B 7/02* (2013.01); *B32B 2037/243* (2013.01); *B32B 2305/08* (2013.01); *B32B 2310/0806* (2013.01); *B32B 2315/06* (2013.01); *B32B 2607/00* (2013.01); *B32B 2260/021* (2013.01); *B32B 2260/046* (2013.01); *B32B 2262/062* (2013.01); *B32B 2262/101* (2013.01); *B32B 2262/106* (2013.01); *B32B 2310/0831* (2013.01); *B32B 2419/00* (2013.01); *B32B 2419/04* (2013.01)
USPC ............. 442/86; 442/131; 442/132; 52/152; 52/409

(56) References Cited

U.S. PATENT DOCUMENTS

| | | |
|---|---|---|
| 525,442 A | 9/1894 | Burrows |
| 575,074 A | 1/1897 | Smith |
| 774,114 A | 11/1904 | Spear |
| 815,801 A | 3/1906 | Depew et al. |
| 1,344,181 A | 6/1920 | Mason |
| 1,399,023 A | 12/1921 | Murray |
| 1,510,497 A | 10/1924 | Keller |
| 1,512,084 A | 10/1924 | Church |
| 1,571,048 A | 1/1926 | Garrow |
| 1,630,801 A | 5/1927 | Parsons |
| 1,634,809 A | 7/1927 | Weiss |
| 1,698,557 A | 1/1929 | O'Brien |
| 1,819,093 A | 8/1931 | Hardinge |
| 1,856,932 A | 5/1932 | Shaw |
| 1,856,936 A | 5/1932 | Turner |
| 1,871,843 A | 8/1932 | Ericson |
| 1,914,163 A | 6/1933 | Randall |
| 1,930,024 A | 10/1933 | Varden |
| 1,943,663 A | 1/1934 | Ericson |
| 1,959,519 A | 5/1934 | Black |
| 1,976,684 A | 10/1934 | Munroe et al. |
| 1,976,984 A | 10/1934 | Condon et al. |
| 1,978,519 A | 10/1934 | Willock et al. |
| 1,995,393 A | 3/1935 | Manske |
| 1,997,939 A | 4/1935 | Loucks |
| 2,009,619 A | 7/1935 | Huffine |
| 2,024,689 A | 12/1935 | Walter et al. |
| 2,030,383 A | 2/1936 | Luth et al. |
| 2,054,854 A | 9/1936 | Dreyfus |
| 2,062,149 A | 11/1936 | Stark et al. |
| 2,156,308 A | 5/1939 | Schuh |
| 2,156,311 A | 5/1939 | Schuh |
| 2,175,568 A | 10/1939 | Haustein |
| 2,175,569 A | 10/1939 | Kennedy |
| 2,176,668 A | 10/1939 | Egeberg et al. |
| 2,182,372 A | 12/1939 | Cox et al. |
| 2,224,351 A | 12/1940 | Kaye |
| 2,253,753 A | 8/1941 | Black |
| 2,276,170 A | 3/1942 | Elmendorf |
| 2,317,634 A | 4/1943 | Olsen |
| 2,320,702 A | 6/1943 | Marchese et al. |
| 2,323,230 A | 6/1943 | McAvoy |
| 2,324,325 A | 7/1943 | Schuh |
| 2,354,639 A | 7/1944 | Seymour |
| 2,377,484 A | 6/1945 | Elmendorf |
| 2,400,357 A | 5/1946 | Krajci |
| 2,413,794 A | 1/1947 | Small |
| 2,447,275 A | 8/1948 | Price |
| 2,511,083 A | 6/1950 | Small |
| 2,517,122 A | 8/1950 | Lockwood |
| 2,518,281 A | 8/1950 | Camp et al. |
| 2,619,776 A | 12/1952 | Potters |
| 2,624,298 A | 1/1953 | Farren |
| 2,645,576 A | 7/1953 | Bate et al. |
| 2,676,892 A | 4/1954 | McLaughlin |
| 2,694,025 A | 11/1954 | Slayter et al. |
| 2,724,872 A | 11/1955 | Herbes |
| 2,746,735 A | 5/1956 | Bradford |
| 2,762,619 A | 9/1956 | Booth |
| 2,782,018 A | 2/1957 | Bradford |
| 2,782,463 A | 2/1957 | Bergvall et al. |
| 2,797,201 A | 6/1957 | Veatch |
| 2,838,881 A | 6/1958 | Plumat |
| 2,879,171 A | 3/1959 | Kullenberg |
| 2,880,101 A | 3/1959 | Ulfstedt |
| 2,928,143 A | 3/1960 | Newton |
| 2,945,326 A | 7/1960 | Wood |
| 2,947,115 A | 8/1960 | Wood |
| 2,978,339 A | 4/1961 | Veatch et al. |
| 2,978,340 A | 4/1961 | Veatch et al. |
| 2,987,408 A | 6/1961 | Minnick |
| 2,997,403 A | 8/1961 | Searight |
| 3,010,177 A | 11/1961 | Thompson et al. |
| 3,046,700 A | 7/1962 | Davenport |
| 3,047,985 A | 8/1962 | Murphy |
| 3,081,179 A | 3/1963 | Charvat et al. |
| 3,106,503 A | 10/1963 | Randall et al. |
| 3,150,947 A | 9/1964 | Bland |
| 3,173,229 A | 3/1965 | Weber |
| 3,181,662 A | 5/1965 | Maertzig, Jr. |
| 3,214,876 A | 11/1965 | Mattes |
| 3,215,505 A | 11/1965 | Schmalfeld et al. |
| 3,235,039 A | 2/1966 | O'Donnell |
| 3,236,932 A | 2/1966 | Grigas et al. |
| 3,256,105 A | 6/1966 | Alford |
| 3,264,125 A | 8/1966 | Bourlin |
| 3,274,743 A | 9/1966 | Blum, Jr. |
| 3,279,905 A | 10/1966 | Wood et al. |
| 3,284,980 A | 11/1966 | Dinkel |
| 3,293,014 A | 12/1966 | Callender et al. |
| 3,297,411 A | 1/1967 | Dear |
| 3,321,414 A | 5/1967 | Vieli |
| 3,333,379 A | 8/1967 | Harris |
| 3,336,710 A | 8/1967 | Raynes |
| 3,341,314 A | 9/1967 | Vukasovich et al. |
| 3,348,956 A | 10/1967 | Ekdahl |
| 3,360,392 A | 12/1967 | Mod et al. |
| 3,365,315 A | 1/1968 | Beck et al. |
| 3,408,786 A | 11/1968 | Snyker |
| 3,415,019 A | 12/1968 | Andersen |
| 3,416,275 A | 12/1968 | Van Loghem et al. |
| 3,421,281 A | 1/1969 | Harris |
| 3,481,093 A | 12/1969 | Davidson |
| 3,495,961 A | 2/1970 | Lange |
| 3,501,324 A | 3/1970 | Kubo |
| 3,527,004 A | 9/1970 | Sorenson |
| 3,560,185 A | 2/1971 | Nylander |
| 3,560,186 A | 2/1971 | Nylander |
| 3,574,113 A | 4/1971 | Shannon |
| 3,582,377 A | 6/1971 | Hays et al. |
| 3,606,720 A | 9/1971 | Cookson |
| 3,616,173 A | 10/1971 | Green et al. |
| 3,625,808 A | 12/1971 | Martin |
| 3,634,567 A | 1/1972 | Yang |
| 3,635,742 A | 1/1972 | Fujimasu et al. |
| 3,660,955 A | 5/1972 | Simon et al. |
| 3,663,341 A | 5/1972 | Veneziale, Jr. |
| 3,663,353 A | 5/1972 | Long et al. |
| 3,679,446 A | 7/1972 | Kubo |
| 3,703,795 A | 11/1972 | Mattes |
| 3,708,943 A | 1/1973 | Thomas et al. |
| 3,716,386 A | 2/1973 | Kempster |
| 3,729,368 A | 4/1973 | Ingham et al. |
| 3,736,162 A | 5/1973 | Chvalovsky et al. |
| 3,748,100 A | 7/1973 | Forseth |
| 3,748,160 A | 7/1973 | Carbajal |
| 3,752,685 A | 8/1973 | Honda et al. |

(56) References Cited

U.S. PATENT DOCUMENTS

| | | |
|---|---|---|
| 3,753,749 A | 8/1973 | Nutt |
| 3,754,365 A | 8/1973 | Carrick et al. |
| 3,780,483 A | 12/1973 | Mattes |
| 3,782,985 A | 1/1974 | Gebhardt |
| 3,797,179 A | 3/1974 | Jackson |
| 3,797,190 A | 3/1974 | Widdowson |
| 3,804,058 A | 4/1974 | Messenger |
| 3,818,668 A | 6/1974 | Charniga |
| 3,835,604 A | 9/1974 | Hoffmann, Jr. |
| 3,836,412 A | 9/1974 | Boustany et al. |
| 3,838,998 A | 10/1974 | Matthews et al. |
| 3,843,380 A | 10/1974 | Beyn |
| 3,847,633 A | 11/1974 | Race |
| 3,865,779 A | 2/1975 | Oya et al. |
| 3,866,378 A | 2/1975 | Kessler |
| 3,869,295 A | 3/1975 | Bowles et al. |
| 3,873,025 A | 3/1975 | Qvarnstrom et al. |
| 3,873,475 A | 3/1975 | Pechacek et al. |
| 3,877,918 A | 4/1975 | Cerbo |
| 3,887,386 A | 6/1975 | Majumdar et al. |
| 3,888,617 A | 6/1975 | Barnett |
| 3,888,957 A | 6/1975 | Netting |
| 3,902,911 A | 9/1975 | Messenger |
| 3,904,377 A | 9/1975 | Honda et al. |
| 3,904,424 A | 9/1975 | Aoki et al. |
| 3,909,283 A | 9/1975 | Warnke |
| 3,918,981 A | 11/1975 | Long |
| 3,921,346 A | 11/1975 | Sauer et al. |
| 3,924,901 A | 12/1975 | Phillips |
| 3,928,701 A | 12/1975 | Roehner |
| 3,931,069 A | 1/1976 | Lundin |
| 3,932,275 A | 1/1976 | Mewes et al. |
| 3,935,364 A | 1/1976 | Proksch et al. |
| 3,954,390 A | 5/1976 | Akhundov et al. |
| 3,965,633 A | 6/1976 | Carroll |
| 3,969,567 A | 7/1976 | Occleshaw et al. |
| 3,974,024 A | 8/1976 | Yano et al. |
| 3,986,312 A | 10/1976 | Calhoun et al. |
| 3,992,845 A | 11/1976 | Grzesiek et al. |
| 3,998,651 A | 12/1976 | Baudouin et al. |
| 3,998,944 A | 12/1976 | Long |
| 4,002,482 A | 1/1977 | Coenen et al. |
| 4,003,752 A | 1/1977 | Isohata et al. |
| 4,009,135 A | 2/1977 | Harreus et al. |
| 4,010,587 A | 3/1977 | Larsen |
| 4,010,589 A | 3/1977 | Gross et al. |
| 4,013,480 A | 3/1977 | Chumbley et al. |
| 4,015,392 A | 4/1977 | Eaton |
| 4,028,859 A | 6/1977 | Bellagamba et al. |
| 4,034,528 A | 7/1977 | Sanders et al. |
| 4,040,851 A | 8/1977 | Ziegler |
| 4,046,548 A | 9/1977 | Wood et al. |
| 4,047,355 A | 9/1977 | Knorr |
| 4,052,220 A | 10/1977 | Turpin, Jr. |
| 4,052,829 A | 10/1977 | Chapman |
| 4,057,908 A | 11/1977 | Mirliss et al. |
| 4,058,944 A | 11/1977 | Rieger |
| 4,059,423 A | 11/1977 | De Vos et al. |
| 4,063,393 A | 12/1977 | Toti |
| 4,065,899 A | 1/1978 | Kirkhuff |
| 4,066,723 A | 1/1978 | King et al. |
| 4,070,199 A | 1/1978 | Downing et al. |
| 4,070,843 A | 1/1978 | Leggiere et al. |
| 4,076,884 A | 2/1978 | Riley et al. |
| 4,079,562 A | 3/1978 | Englert et al. |
| 4,088,804 A | 5/1978 | Cornwell et al. |
| 4,098,701 A | 7/1978 | Burrill et al. |
| 4,101,335 A | 7/1978 | Barrable et al. |
| 4,102,106 A | 7/1978 | Golder et al. |
| 4,102,697 A | 7/1978 | Fukuba et al. |
| 4,102,773 A | 7/1978 | Green et al. |
| 4,104,103 A | 8/1978 | Tarullo |
| 4,104,840 A | 8/1978 | Heintz et al. |
| 4,110,507 A | 8/1978 | Colledge |
| 4,111,713 A | 9/1978 | Beck |
| 4,112,647 A | 9/1978 | Scheid |
| 4,118,236 A | 10/1978 | Erskine et al. |
| 4,128,696 A | 12/1978 | Goebel et al. |
| 4,131,480 A | 12/1978 | McCurrich et al. |
| 4,131,638 A | 12/1978 | Whitaker et al. |
| 4,132,555 A | 1/1979 | Barrable et al. |
| 4,133,854 A | 1/1979 | Hendricks |
| 4,133,928 A | 1/1979 | Riley et al. |
| 4,134,773 A | 1/1979 | Simeonov et al. |
| 4,138,313 A | 2/1979 | Hillstrom et al. |
| 4,144,121 A | 3/1979 | Otouma et al. |
| 4,150,517 A | 4/1979 | Warner, Sr. |
| 4,152,878 A | 5/1979 | Balinski |
| 4,153,439 A | 5/1979 | Tomic et al. |
| 4,161,389 A | 7/1979 | Staffin et al. |
| 4,162,924 A | 7/1979 | Kubo et al. |
| 4,166,749 A | 9/1979 | Sterrett et al. |
| 4,177,176 A | 12/1979 | Burrill et al. |
| 4,183,188 A | 1/1980 | Goldsby |
| 4,184,906 A | 1/1980 | Young |
| 4,187,658 A | 2/1980 | Reinwall, Jr. |
| 4,188,231 A | 2/1980 | Valore |
| 4,203,788 A | 5/1980 | Clear |
| 4,204,644 A | 5/1980 | Kozuka et al. |
| 4,205,992 A | 6/1980 | Mogensen et al. |
| 4,211,525 A | 7/1980 | Vetter et al. |
| 4,217,335 A | 8/1980 | Sasaki et al. |
| 4,222,785 A | 9/1980 | Henderson |
| 4,225,383 A | 9/1980 | McReynolds |
| 4,226,841 A | 10/1980 | Komeya et al. |
| 4,231,573 A | 11/1980 | Kelly |
| 4,234,344 A | 11/1980 | Tinsley et al. |
| 4,235,753 A | 11/1980 | Brown et al. |
| 4,235,836 A | 11/1980 | Wassell et al. |
| 4,240,840 A | 12/1980 | Downing et al. |
| 4,243,421 A | 1/1981 | Kume et al. |
| 4,250,134 A | 2/1981 | Minnick |
| 4,252,193 A | 2/1981 | Powers et al. |
| 4,256,504 A | 3/1981 | Dunstan, Jr. |
| 4,256,584 A | 3/1981 | Lord et al. |
| 4,258,090 A | 3/1981 | Moraru |
| 4,261,286 A | 4/1981 | Kupfer et al. |
| 4,261,754 A | 4/1981 | Krenchel et al. |
| 4,265,674 A | 5/1981 | Debus et al. |
| 4,268,316 A | 5/1981 | Wills, Jr. |
| 4,268,317 A | 5/1981 | Rayl |
| 4,274,239 A | 6/1981 | Carroll |
| 4,274,913 A | 6/1981 | Kikuiri et al. |
| 4,292,206 A | 9/1981 | Barnes, Jr. et al. |
| 4,292,364 A | 9/1981 | Wesch et al. |
| 4,295,907 A | 10/1981 | Cordts et al. |
| 4,298,413 A | 11/1981 | Teare |
| 4,298,647 A | 11/1981 | Cancio et al. |
| 4,303,732 A | 12/1981 | Torobin |
| 4,304,604 A | 12/1981 | Daerr et al. |
| 4,305,758 A | 12/1981 | Powers et al. |
| 4,306,911 A | 12/1981 | Gordon et al. |
| 4,307,142 A | 12/1981 | Blitstein et al. |
| 4,307,551 A | 12/1981 | Crandell |
| 4,321,780 A | 3/1982 | Hooper et al. |
| 4,327,528 A | 5/1982 | Fritz |
| 4,328,145 A | 5/1982 | Bobrowski et al. |
| 4,330,634 A | 5/1982 | Rodaway |
| 4,332,618 A | 6/1982 | Ballard |
| 4,336,338 A | 6/1982 | Downs et al. |
| 4,337,290 A | 6/1982 | Kelly et al. |
| 4,339,289 A | 7/1982 | Lankard |
| 4,339,489 A | 7/1982 | Barker et al. |
| 4,340,407 A | 7/1982 | Anderson et al. |
| 4,343,127 A | 8/1982 | Greve et al. |
| 4,344,804 A | 8/1982 | Bijen et al. |
| 4,347,155 A | 8/1982 | Jenkins |
| 4,350,567 A | 9/1982 | Moorehead et al. |
| 4,351,867 A | 9/1982 | Mulvey et al. |
| 4,357,271 A | 11/1982 | Rosenquist |
| 4,361,616 A | 11/1982 | Bomers et al. |
| 4,362,566 A | 12/1982 | Hinterwaldner et al. |
| 4,363,878 A | 12/1982 | Yamamoto et al. |
| 4,366,657 A | 1/1983 | Hopman |

(56) References Cited

U.S. PATENT DOCUMENTS

| | | |
|---|---|---|
| 4,370,166 A | 1/1983 | Powers et al. |
| 4,373,955 A | 2/1983 | Bouchard et al. |
| 4,373,957 A | 2/1983 | Pedersen et al. |
| 4,374,672 A | 2/1983 | Funston et al. |
| 4,375,489 A | 3/1983 | Muszynski |
| 4,377,977 A | 3/1983 | Wurster |
| 4,379,553 A | 4/1983 | Kelly |
| 4,379,729 A | 4/1983 | Cross et al. |
| 4,380,564 A | 4/1983 | Cancio et al. |
| 4,383,960 A | 5/1983 | Delcoigne et al. |
| 4,388,257 A | 6/1983 | Oguri et al. |
| 4,392,336 A | 7/1983 | Ganssle |
| 4,394,175 A | 7/1983 | Cheriton et al. |
| 4,394,346 A | 7/1983 | Morooka et al. |
| 4,399,643 A | 8/1983 | Hafner et al. |
| 4,403,006 A | 9/1983 | Bruce et al. |
| 4,406,703 A | 9/1983 | Guthrie et al. |
| 4,411,723 A | 10/1983 | Takeuchi |
| 4,411,847 A | 10/1983 | Netting et al. |
| 4,420,351 A | 12/1983 | Lussi et al. |
| 4,424,261 A | 1/1984 | Keeling et al. |
| 4,428,775 A | 1/1984 | Johnson et al. |
| 4,429,214 A | 1/1984 | Brindley et al. |
| 4,430,108 A | 2/1984 | Hojaji et al. |
| 4,441,944 A | 4/1984 | Massey |
| 4,442,219 A | 4/1984 | TenEyck et al. |
| 4,448,599 A | 5/1984 | Mackenzie et al. |
| 4,450,022 A | 5/1984 | Galer |
| 4,450,663 A * | 5/1984 | Watkins .................. 52/309.4 |
| 4,457,785 A | 7/1984 | Hsu et al. |
| 4,462,730 A | 7/1984 | Knohl |
| 4,462,835 A | 7/1984 | Car et al. |
| 4,463,532 A | 8/1984 | Faw |
| 4,465,729 A | 8/1984 | Cancio et al. |
| 4,475,936 A | 10/1984 | Aston et al. |
| 4,478,736 A | 10/1984 | Raba, Jr. et al. |
| 4,487,620 A | 12/1984 | Neusy et al. |
| 4,495,301 A | 1/1985 | Sutor |
| 4,497,688 A | 2/1985 | Schaefer |
| 4,498,913 A | 2/1985 | Tank et al. |
| 4,501,830 A | 2/1985 | Miller et al. |
| 4,502,256 A | 3/1985 | Hahn et al. |
| 4,504,320 A | 3/1985 | Rizer et al. |
| 4,504,335 A | 3/1985 | Galer |
| 4,506,486 A | 3/1985 | Culpepper, Jr. et al. |
| 4,507,154 A | 3/1985 | Burge et al. |
| 4,510,020 A | 4/1985 | Green et al. |
| 4,512,736 A | 4/1985 | Wader et al. |
| 4,514,947 A | 5/1985 | Grail |
| 4,517,375 A | 5/1985 | Schmidt et al. |
| 4,519,777 A | 5/1985 | Akhtyamov et al. |
| 4,528,307 A | 7/1985 | Fuhr et al. |
| 4,538,530 A | 9/1985 | Whitman |
| 4,540,629 A | 9/1985 | Sands et al. |
| 4,543,159 A | 9/1985 | Johnson et al. |
| 4,548,676 A | 10/1985 | Johnstone et al. |
| 4,553,366 A | 11/1985 | Guerin et al. |
| 4,559,894 A | 12/1985 | Thompson |
| 4,574,012 A | 3/1986 | Oguri et al. |
| 4,576,736 A | 3/1986 | Harmuth |
| 4,586,304 A | 5/1986 | Flamand et al. |
| 4,588,443 A | 5/1986 | Bache et al. |
| 4,590,884 A | 5/1986 | Kreeger et al. |
| 4,592,185 A | 6/1986 | Lynch et al. |
| 4,595,662 A | 6/1986 | Mochida et al. |
| 4,602,962 A | 7/1986 | Fehlmann et al. |
| 4,621,024 A | 11/1986 | Wright |
| 4,623,390 A | 11/1986 | Delmonico |
| 4,624,798 A | 11/1986 | Gindrup et al. |
| 4,626,398 A | 12/1986 | Vetter et al. |
| 4,629,413 A | 12/1986 | Michelson et al. |
| 4,637,860 A | 1/1987 | Harper et al. |
| 4,637,990 A | 1/1987 | Torobin |
| 4,640,715 A | 2/1987 | Heitzmann et al. |
| 4,641,469 A | 2/1987 | Wood |
| 4,642,137 A | 2/1987 | Heitzmann et al. |
| 4,643,753 A | 2/1987 | Braun |
| 4,643,920 A | 2/1987 | McEntee et al. |
| 4,647,496 A * | 3/1987 | Lehnert et al. .................. 442/386 |
| 4,647,505 A | 3/1987 | Blackie et al. |
| 4,647,509 A | 3/1987 | Wallace et al. |
| 4,647,589 A | 3/1987 | Valone |
| 4,652,433 A | 3/1987 | Ashworth et al. |
| 4,652,535 A | 3/1987 | Mackenzie et al. |
| 4,655,979 A | 4/1987 | Nakano et al. |
| 4,657,810 A | 4/1987 | Douden |
| 4,659,386 A | 4/1987 | Nagai et al. |
| 4,659,679 A | 4/1987 | Falk |
| 4,661,137 A | 4/1987 | Garnier et al. |
| 4,661,398 A | 4/1987 | Ellis |
| 4,670,079 A | 6/1987 | Thompson |
| 4,673,659 A | 6/1987 | Wood et al. |
| 4,677,022 A | 6/1987 | Dejaiffe |
| 4,680,059 A | 7/1987 | Cook et al. |
| 4,685,263 A | 8/1987 | Ting |
| 4,687,752 A | 8/1987 | Peters |
| 4,689,084 A | 8/1987 | Ambroise et al. |
| 4,698,942 A | 10/1987 | Swartz |
| 4,721,160 A | 1/1988 | Parcevaux et al. |
| 4,723,505 A | 2/1988 | Wilson et al. |
| 4,730,398 A | 3/1988 | Stanton |
| 4,737,191 A | 4/1988 | Meynardi et al. |
| 4,738,723 A | 4/1988 | Frizzell et al. |
| 4,746,364 A | 5/1988 | Kawai et al. |
| 4,748,771 A | 6/1988 | Lehnert et al. |
| 4,749,398 A | 6/1988 | Braun |
| 4,751,202 A | 6/1988 | Toussaint et al. |
| 4,751,203 A | 6/1988 | Toussaint et al. |
| 4,752,061 A | 6/1988 | Dalton et al. |
| 4,759,802 A | 7/1988 | Ochi et al. |
| 4,766,113 A | 8/1988 | West et al. |
| 4,767,491 A | 8/1988 | Vittone et al. |
| 4,767,726 A | 8/1988 | Marshall |
| 4,769,189 A | 9/1988 | Douden |
| 4,770,831 A | 9/1988 | Walker et al. |
| 4,772,328 A | 9/1988 | Pfeifer |
| 4,775,505 A | 10/1988 | Kuroda et al. |
| 4,779,313 A | 10/1988 | Gonas |
| 4,780,141 A | 10/1988 | Double et al. |
| 4,784,839 A | 11/1988 | Bachelard et al. |
| 4,789,604 A | 12/1988 | van der Hoeven et al. |
| 4,793,861 A | 12/1988 | Sohm et al. |
| 4,797,161 A | 1/1989 | Kirchmayr et al. |
| 4,803,105 A | 2/1989 | Kretow et al. |
| 4,806,203 A | 2/1989 | Elton |
| 4,808,229 A | 2/1989 | Arhelger et al. |
| 4,811,538 A | 3/1989 | Lehnert et al. |
| 4,816,091 A | 3/1989 | Miller |
| 4,818,289 A | 4/1989 | Mantymaki et al. |
| 4,818,290 A | 4/1989 | Tuovinen et al. |
| 4,818,595 A | 4/1989 | Ellis |
| 4,819,289 A | 4/1989 | Gibbs |
| 4,826,788 A | 5/1989 | Dennert et al. |
| 4,827,621 A | 5/1989 | Borsuk |
| 4,830,989 A | 5/1989 | Trivedi et al. |
| 4,837,069 A | 6/1989 | Bescup et al. |
| 4,840,672 A | 6/1989 | Baes et al. |
| 4,840,688 A | 6/1989 | Vogt et al. |
| 4,841,702 A | 6/1989 | Huettemann |
| 4,841,705 A | 6/1989 | Fuhrer |
| 4,842,649 A | 6/1989 | Heitzmann et al. |
| 4,846,889 A | 7/1989 | Meyer |
| 4,851,203 A | 7/1989 | Bachelard et al. |
| 4,854,101 A | 8/1989 | Champagne |
| 4,858,402 A | 8/1989 | Putz et al. |
| 4,866,896 A | 9/1989 | Shreiner et al. |
| 4,867,931 A | 9/1989 | Cochran, Jr. |
| 4,870,788 A | 10/1989 | Hassan et al. |
| 4,871,380 A | 10/1989 | Meyers |
| 4,871,495 A | 10/1989 | Helferich et al. |
| 4,876,827 A | 10/1989 | Williams et al. |
| 4,882,302 A | 11/1989 | Horiuchi et al. |
| 4,888,057 A | 12/1989 | Nguyen et al. |
| 4,894,081 A | 1/1990 | Neusy et al. |

(56) References Cited

U.S. PATENT DOCUMENTS

| | | |
|---|---|---|
| 4,895,598 A | 1/1990 | Hedberg et al. |
| 4,904,292 A | 2/1990 | Neusy et al. |
| 4,904,503 A | 2/1990 | Hilton et al. |
| 4,906,408 A | 3/1990 | Bouniol et al. |
| 4,910,047 A | 3/1990 | Barnett et al. |
| 4,914,885 A | 4/1990 | Baker et al. |
| 4,915,740 A | 4/1990 | Sakai et al. |
| 4,924,644 A | 5/1990 | Lewis |
| 4,927,696 A | 5/1990 | Berg et al. |
| 4,928,479 A | 5/1990 | Shekleton et al. |
| 4,930,287 A | 6/1990 | Volk et al. |
| 4,933,013 A | 6/1990 | Sakai et al. |
| 4,933,031 A | 6/1990 | Blomberg et al. |
| 4,935,060 A | 6/1990 | Dingsoyr et al. |
| 4,937,210 A | 6/1990 | Jones et al. |
| 4,937,993 A | 7/1990 | Hitchins et al. |
| 4,938,958 A | 7/1990 | Niira et al. |
| 4,944,842 A | 7/1990 | Stromberg et al. |
| 4,946,505 A | 8/1990 | Jungk et al. |
| 4,946,811 A | 8/1990 | Tuovinen et al. |
| 4,952,631 A | 8/1990 | McAlpin et al. |
| 4,955,169 A | 9/1990 | Shisko et al. |
| 4,963,430 A | 10/1990 | Kish et al. |
| 4,969,250 A | 11/1990 | Hickman et al. |
| 4,969,302 A | 11/1990 | Coggan et al. |
| 4,971,658 A | 11/1990 | Henrickson et al. |
| 4,975,396 A | 12/1990 | Thiery et al. |
| 4,981,666 A | 1/1991 | Yamada et al. |
| 4,981,740 A | 1/1991 | Larsen et al. |
| 4,983,550 A | 1/1991 | Goetz et al. |
| 4,985,119 A | 1/1991 | Vinson et al. |
| 4,994,113 A | 2/1991 | Helmstetter |
| 4,995,605 A | 2/1991 | Conville |
| 4,999,056 A | 3/1991 | Rasmussen et al. |
| 5,002,696 A | 3/1991 | White |
| 5,009,713 A | 4/1991 | Sakuta et al. |
| 5,017,232 A | 5/1991 | Miceli |
| 5,018,909 A | 5/1991 | Crum et al. |
| 5,021,093 A | 6/1991 | Beshay |
| 5,022,207 A | 6/1991 | Hartnett |
| 5,022,897 A | 6/1991 | Balcar et al. |
| 5,029,425 A | 7/1991 | Bogataj |
| 5,030,287 A | 7/1991 | Magnani et al. |
| 5,030,289 A | 7/1991 | Sattler et al. |
| 5,032,548 A | 7/1991 | Lowe |
| 5,035,920 A | 7/1991 | Smrt et al. |
| 5,045,378 A | 9/1991 | Libby |
| 5,047,086 A | 9/1991 | Hayakawa et al. |
| 5,049,196 A | 9/1991 | Ries |
| 5,063,260 A | 11/1991 | Chen et al. |
| 5,064,784 A | 11/1991 | Saito et al. |
| 5,067,675 A | 11/1991 | Brant et al. |
| D322,678 S | 12/1991 | Brathwaite et al. |
| 5,069,702 A | 12/1991 | Block et al. |
| 5,073,197 A | 12/1991 | Majumdar et al. |
| 5,076,986 A | 12/1991 | Delvaux et al. |
| 5,077,241 A | 12/1991 | Moh et al. |
| 5,077,952 A | 1/1992 | Moore |
| 5,080,022 A | 1/1992 | Carlson |
| 5,096,858 A | 3/1992 | Das Chaklader et al. |
| 5,099,923 A | 3/1992 | Aften et al. |
| 5,102,596 A | 4/1992 | Lempfer et al. |
| 5,106,557 A | 4/1992 | Rirsch et al. |
| 5,108,510 A | 4/1992 | Burge et al. |
| 5,108,679 A | 4/1992 | Rirsch et al. |
| 5,112,405 A | 5/1992 | Sanchez |
| 5,114,617 A | 5/1992 | Smetana et al. |
| 5,115,621 A | 5/1992 | Kobayashi et al. |
| 5,117,600 A | 6/1992 | Yerushalmi et al. |
| 5,117,770 A | 6/1992 | Hassinen et al. |
| 5,118,225 A | 6/1992 | Koch et al. |
| 5,128,114 A | 7/1992 | Schwartz |
| 5,143,534 A | 9/1992 | Kilner et al. |
| 5,143,780 A | 9/1992 | Balassa |
| 5,154,596 A | 10/1992 | Schwartz et al. |
| 5,154,771 A | 10/1992 | Wada et al. |
| 5,155,958 A | 10/1992 | Huff |
| 5,162,060 A | 11/1992 | Bredow et al. |
| 5,164,003 A | 11/1992 | Bosco et al. |
| 5,164,345 A | 11/1992 | Rice et al. |
| 5,167,710 A | 12/1992 | Leroux et al. |
| 5,169,558 A | 12/1992 | Smrt et al. |
| 5,174,821 A | 12/1992 | Matsuoka et al. |
| 5,176,732 A | 1/1993 | Block et al. |
| 5,177,305 A | 1/1993 | Pichat et al. |
| 5,190,737 A | 3/1993 | Weimer et al. |
| 5,191,456 A | 3/1993 | Sutherland et al. |
| 5,192,366 A | 3/1993 | Nishioka et al. |
| 5,194,334 A | 3/1993 | Uerdingen et al. |
| 5,198,052 A | 3/1993 | Ali |
| 5,198,275 A | 3/1993 | Klein |
| 5,210,989 A | 5/1993 | Jakel |
| 5,217,928 A | 6/1993 | Goetz et al. |
| 5,220,762 A | 6/1993 | Lehnert et al. |
| 5,223,090 A | 6/1993 | Klungness et al. |
| 5,226,274 A | 7/1993 | Sommerstein et al. |
| 5,229,437 A | 7/1993 | Knight |
| 5,232,497 A | 8/1993 | Dillenbeck et al. |
| 5,234,754 A | 8/1993 | Bache et al. |
| 5,236,773 A | 8/1993 | Sorathia et al. |
| 5,236,994 A | 8/1993 | Markusch et al. |
| D339,642 S | 9/1993 | Blazley et al. |
| 5,242,736 A | 9/1993 | Van Erden et al. |
| 5,244,318 A | 9/1993 | Arai et al. |
| 5,245,811 A | 9/1993 | Knorr |
| 5,247,773 A | 9/1993 | Weir |
| 5,252,526 A | 10/1993 | Whittemore |
| 5,253,991 A | 10/1993 | Yokota et al. |
| 5,254,228 A | 10/1993 | Westhof et al. |
| 5,256,180 A | 10/1993 | Garnier et al. |
| 5,256,349 A | 10/1993 | Sato et al. |
| 5,259,872 A | 11/1993 | Shinozaki et al. |
| 5,268,226 A | 12/1993 | Sweeney |
| 5,281,271 A | 1/1994 | Govani et al. |
| 5,282,317 A | 2/1994 | Carter et al. |
| 5,290,355 A | 3/1994 | Jakel |
| 5,292,690 A | 3/1994 | Kawachi et al. |
| 5,294,255 A | 3/1994 | Smetana et al. |
| 5,297,370 A | 3/1994 | Greenstreet et al. |
| 5,301,484 A | 4/1994 | Jansson et al. |
| 5,305,568 A | 4/1994 | Beckerman |
| 5,305,577 A | 4/1994 | Richards et al. |
| 5,312,858 A | 5/1994 | Folsom |
| 5,314,119 A | 5/1994 | Watt |
| 5,319,245 A | 6/1994 | Chen et al. |
| 5,319,909 A | 6/1994 | Singleterry |
| 5,323,581 A | 6/1994 | Jakel |
| 5,330,573 A | 7/1994 | Nakano et al. |
| 5,334,242 A | 8/1994 | O'Toole |
| 5,338,349 A | 8/1994 | Farrar |
| 5,338,357 A | 8/1994 | Takai et al. |
| 5,342,485 A | 8/1994 | Armbrust, Jr. |
| 5,342,530 A | 8/1994 | Aften et al. |
| 5,346,012 A | 9/1994 | Heathman et al. |
| 5,346,541 A | 9/1994 | Goldman et al. |
| 5,349,118 A | 9/1994 | Davidovits |
| 5,349,802 A | 9/1994 | Kariniemi |
| 5,352,288 A | 10/1994 | Mallow |
| 5,352,290 A | 10/1994 | Takeshita et al. |
| 5,358,676 A | 10/1994 | Jennings et al. |
| 5,366,637 A | 11/1994 | Turunc |
| 5,369,924 A | 12/1994 | Neudorf et al. |
| 5,372,678 A | 12/1994 | Sagstetter et al. |
| 5,378,279 A | 1/1995 | Conroy et al. |
| 5,383,521 A | 1/1995 | Onan et al. |
| 5,383,967 A | 1/1995 | Chase |
| 5,384,345 A | 1/1995 | Naton |
| 5,385,764 A | 1/1995 | Andersen et al. |
| 5,387,282 A | 2/1995 | Jakel |
| 5,387,283 A | 2/1995 | Kirkpatrick et al. |
| 5,387,626 A | 2/1995 | Bohme-Kovac et al. |
| 5,391,245 A | 2/1995 | Turner |
| 5,394,672 A | 3/1995 | Seem |
| 5,395,672 A | 3/1995 | Pingaud et al. |

(56) References Cited

U.S. PATENT DOCUMENTS

| | | |
|---|---|---|
| 5,395,685 A | 3/1995 | Seth et al. |
| 5,397,631 A | 3/1995 | Green et al. |
| 5,403,392 A | 4/1995 | Craig |
| 5,403,394 A | 4/1995 | Burgand |
| 5,405,498 A | 4/1995 | Pease |
| 5,407,983 A | 4/1995 | Naton |
| 5,410,852 A | 5/1995 | Edgar et al. |
| 5,415,734 A | 5/1995 | Backlund et al. |
| 5,421,867 A | 6/1995 | Yeager et al. |
| 5,425,985 A | 6/1995 | Irvin |
| 5,425,986 A | 6/1995 | Guyette |
| 5,428,931 A | 7/1995 | Ragsdale |
| 5,429,717 A | 7/1995 | Bokstrom et al. |
| 5,432,212 A | 7/1995 | Honda et al. |
| 5,432,215 A | 7/1995 | Girg et al. |
| 5,437,934 A | 8/1995 | Witt et al. |
| 5,439,518 A | 8/1995 | Francis et al. |
| 5,443,603 A | 8/1995 | Kirkendall |
| 5,447,798 A | 9/1995 | Kamaishi et al. |
| 5,453,123 A | 9/1995 | Burge et al. |
| 5,453,310 A | 9/1995 | Andersen et al. |
| 5,455,212 A | 10/1995 | Das Chaklader et al. |
| 5,458,973 A | 10/1995 | Jeffs et al. |
| 5,461,839 A | 10/1995 | Beck |
| 5,465,547 A | 11/1995 | Jakel |
| 5,470,383 A | 11/1995 | Schermann et al. |
| 5,472,486 A | 12/1995 | Dragner et al. |
| 5,475,961 A | 12/1995 | Menchetti |
| 5,477,617 A | 12/1995 | Guy |
| 5,482,550 A | 1/1996 | Strait |
| 5,482,551 A | 1/1996 | Morris et al. |
| 5,484,480 A | 1/1996 | Styron |
| 5,490,889 A | 2/1996 | Kirkpatrick et al. |
| 5,501,050 A | 3/1996 | Ruel et al. |
| 5,508,072 A | 4/1996 | Andersen et al. |
| 5,511,316 A | 4/1996 | Fischer et al. |
| 5,517,795 A | 5/1996 | Doke |
| 5,520,779 A | 5/1996 | Bold et al. |
| 5,522,926 A | 6/1996 | Richard et al. |
| 5,522,986 A | 6/1996 | Shi et al. |
| 5,525,556 A | 6/1996 | Dunmead et al. |
| 5,526,627 A | 6/1996 | Beck |
| 5,531,824 A | 7/1996 | Burkes et al. |
| 5,534,348 A | 7/1996 | Miller et al. |
| 5,536,310 A | 7/1996 | Brook et al. |
| 5,545,297 A | 8/1996 | Andersen et al. |
| 5,547,505 A | 8/1996 | Nakatsu et al. |
| 5,549,859 A | 8/1996 | Andersen et al. |
| 5,556,458 A | 9/1996 | Brook et al. |
| 5,557,903 A | 9/1996 | Haddock |
| 5,558,710 A | 9/1996 | Baig |
| 5,558,822 A | 9/1996 | Gitman et al. |
| 5,559,170 A | 9/1996 | Castle |
| 5,561,173 A | 10/1996 | Dry |
| 5,562,832 A | 10/1996 | McOnie et al. |
| 5,564,233 A | 10/1996 | Norton |
| 5,564,245 A | 10/1996 | Rademacher |
| 5,565,026 A | 10/1996 | Hense et al. |
| 5,577,024 A | 11/1996 | Malkamaki et al. |
| 5,580,378 A | 12/1996 | Shulman |
| 5,580,409 A | 12/1996 | Andersen et al. |
| 5,580,508 A | 12/1996 | Kobayashi et al. |
| 5,580,907 A | 12/1996 | Savin |
| 5,583,079 A | 12/1996 | Golitz et al. |
| 5,591,684 A | 1/1997 | Kawachi et al. |
| RE35,460 E | 2/1997 | Klungness et al. |
| 5,598,671 A | 2/1997 | Ting |
| 5,601,789 A | 2/1997 | Ruhl et al. |
| 5,603,758 A | 2/1997 | Schreifels, Jr. et al. |
| 5,609,833 A | 3/1997 | Ruhl et al. |
| 5,611,833 A | 3/1997 | Brahmbhatt et al. |
| 5,611,883 A | 3/1997 | Tompkins et al. |
| 5,617,690 A | 4/1997 | Gibbs |
| 5,618,173 A | 4/1997 | Ruhl et al. |
| 5,622,556 A | 4/1997 | Shulman |
| 5,631,097 A | 5/1997 | Andersen et al. |
| 5,634,314 A | 6/1997 | Champagne |
| 5,641,584 A | 6/1997 | Andersen et al. |
| 5,643,359 A | 7/1997 | Soroushian et al. |
| 5,644,880 A | 7/1997 | Lehnert et al. |
| 5,648,144 A | 7/1997 | Maurer et al. |
| 5,651,227 A | 7/1997 | Anderson |
| 5,655,853 A | 8/1997 | Wormser |
| 5,658,624 A | 8/1997 | Anderson et al. |
| 5,658,656 A | 8/1997 | Whitney et al. |
| 5,661,939 A | 9/1997 | Coulis et al. |
| 5,673,489 A | 10/1997 | Robell |
| 5,673,529 A | 10/1997 | Treister et al. |
| 5,675,955 A | 10/1997 | Champagne |
| 5,676,536 A | 10/1997 | Ruhl et al. |
| 5,676,563 A | 10/1997 | Kondo et al. |
| 5,681,384 A | 10/1997 | Liskowitz et al. |
| 5,692,345 A | 12/1997 | Mogaki et al. |
| 5,693,137 A | 12/1997 | Styron |
| 5,694,727 A | 12/1997 | Dobija |
| 5,697,189 A | 12/1997 | Miller et al. |
| D388,884 S | 1/1998 | Karnoski |
| 5,705,542 A | 1/1998 | Roffael et al. |
| 5,709,743 A | 1/1998 | Leture et al. |
| 5,714,002 A | 2/1998 | Styron |
| 5,718,758 A | 2/1998 | Breslauer |
| 5,718,759 A | 2/1998 | Stav et al. |
| 5,718,943 A | 2/1998 | Hsu et al. |
| 5,722,386 A | 3/1998 | Fladgard et al. |
| 5,724,783 A | 3/1998 | Mandish |
| 5,725,652 A | 3/1998 | Shulman |
| 5,728,458 A | 3/1998 | Sweeney |
| 5,729,946 A | 3/1998 | Beck |
| 5,732,520 A | 3/1998 | Maietta |
| 5,735,092 A | 4/1998 | Clayton et al. |
| 5,736,594 A | 4/1998 | Boles et al. |
| 5,736,602 A | 4/1998 | Crocker et al. |
| 5,741,844 A | 4/1998 | Nass et al. |
| 5,743,056 A | 4/1998 | Balla-Goddard et al. |
| 5,743,393 A | 4/1998 | Webb et al. |
| 5,744,078 A | 4/1998 | Soroushian et al. |
| 5,749,187 A | 5/1998 | Umehara et al. |
| 5,768,841 A | 6/1998 | Swartz et al. |
| 5,777,024 A | 7/1998 | Killilea et al. |
| 5,786,282 A | 7/1998 | Carter et al. |
| 5,791,109 A * | 8/1998 | Lehnert et al. ............ 52/309.17 |
| 5,795,515 A | 8/1998 | Fischer et al. |
| 5,802,790 A | 9/1998 | Lamont et al. |
| 5,804,003 A | 9/1998 | Nishizawa et al. |
| 5,817,230 A | 10/1998 | Groppo, Jr. et al. |
| 5,817,262 A | 10/1998 | Englert |
| 5,820,668 A | 10/1998 | Comrie et al. |
| 5,842,280 A | 12/1998 | Robell |
| 5,848,508 A | 12/1998 | Albrecht |
| 5,848,509 A | 12/1998 | Knapp et al. |
| 5,849,055 A | 12/1998 | Arai et al. |
| 5,851,607 A | 12/1998 | Horinka et al. |
| 5,853,475 A | 12/1998 | Liskowitz et al. |
| 5,857,303 A | 1/1999 | Beck et al. |
| 5,858,083 A | 1/1999 | Stav et al. |
| 5,863,477 A | 1/1999 | Kawai et al. |
| 5,866,057 A | 2/1999 | Roffael et al. |
| 5,871,824 A | 2/1999 | Bates et al. |
| 5,876,561 A | 3/1999 | Tsai |
| 5,878,543 A | 3/1999 | Mowery |
| 5,883,029 A | 3/1999 | Castle |
| 5,887,403 A | 3/1999 | Beck |
| 5,888,322 A | 3/1999 | Holland |
| 5,891,374 A | 4/1999 | Shah et al. |
| 5,891,516 A | 4/1999 | Gstrein et al. |
| 5,895,768 A | 4/1999 | Speit et al. |
| 5,897,701 A | 4/1999 | Soroushian et al. |
| 5,899,256 A | 5/1999 | Rohatgi |
| 5,900,053 A | 5/1999 | Brothers et al. |
| 5,916,095 A | 6/1999 | Tamlyn |
| 5,924,213 A | 7/1999 | Lee |
| 5,925,449 A | 7/1999 | Davidovits |
| 5,928,777 A | 7/1999 | Cox et al. |
| 5,932,347 A | 8/1999 | Rapp et al. |

(56) References Cited

U.S. PATENT DOCUMENTS

| | | |
|---|---|---|
| 5,935,699 A | 8/1999 | Barber et al. |
| 5,945,044 A | 8/1999 | Kawai et al. |
| 5,945,208 A | 8/1999 | Richards et al. |
| 5,946,870 A | 9/1999 | Bifano et al. |
| 5,946,876 A | 9/1999 | Grace, Sr. et al. |
| 5,948,505 A | 9/1999 | Puppin |
| 5,950,319 A | 9/1999 | Harris |
| 5,967,211 A | 10/1999 | Lucas et al. |
| 5,968,257 A | 10/1999 | Ahrens |
| 5,979,135 A | 11/1999 | Reeves |
| 5,987,838 A | 11/1999 | Beck |
| 5,989,335 A | 11/1999 | Soroushian et al. |
| 5,997,630 A | 12/1999 | Angelskar et al. |
| 5,997,632 A | 12/1999 | Styron |
| 6,000,185 A | 12/1999 | Beck et al. |
| 6,008,275 A | 12/1999 | Moreau et al. |
| 6,012,255 A | 1/2000 | Smid et al. |
| 6,018,924 A | 2/2000 | Tamlyn |
| 6,026,616 A | 2/2000 | Gibson |
| 6,027,330 A | 2/2000 | Lifshits |
| 6,029,415 A | 2/2000 | Culpepper et al. |
| 6,030,447 A | 2/2000 | Naji et al. |
| 6,034,155 A | 3/2000 | Espeland et al. |
| 6,045,057 A | 4/2000 | Moor et al. |
| 6,045,871 A | 4/2000 | Matt et al. |
| 6,046,269 A | 4/2000 | Nass et al. |
| 6,048,593 A | 4/2000 | Espeland et al. |
| 6,049,987 A | 4/2000 | Robell |
| 6,055,787 A | 5/2000 | Gerhaher et al. |
| 6,063,856 A | 5/2000 | Mass |
| 6,077,327 A | 6/2000 | Hamayoshi et al. |
| 6,079,175 A | 6/2000 | Clear |
| 6,084,011 A | 7/2000 | Lucero et al. |
| 6,086,998 A | 7/2000 | Wihsmann et al. |
| 6,093,473 A | 7/2000 | Min et al. |
| 6,096,388 A | 8/2000 | Bates et al. |
| 6,105,888 A | 8/2000 | Goehner et al. |
| 6,110,525 A | 8/2000 | Stoddard |
| 6,122,876 A | 9/2000 | Bado et al. |
| 6,122,877 A | 9/2000 | Hendrickson et al. |
| 6,134,855 A | 10/2000 | Beck |
| 6,136,383 A | 10/2000 | Schwartz et al. |
| 6,138,430 A | 10/2000 | Van Acoleyen et al. |
| 6,139,620 A | 10/2000 | Suzuki et al. |
| 6,143,069 A | 11/2000 | Brothers et al. |
| 6,145,255 A | 11/2000 | Allaster |
| 6,159,281 A | 12/2000 | Uchida et al. |
| 6,161,353 A | 12/2000 | Negola et al. |
| 6,161,354 A | 12/2000 | Gilbert et al. |
| 6,162,511 A | 12/2000 | Garnett et al. |
| 6,164,032 A | 12/2000 | Beck |
| 6,164,214 A | 12/2000 | Smorgon et al. |
| 6,167,668 B1 * | 1/2001 | Fine et al. ............... 52/403.1 |
| 6,170,212 B1 | 1/2001 | Suchyna et al. |
| 6,170,214 B1 | 1/2001 | Treister et al. |
| 6,170,215 B1 | 1/2001 | Nasi |
| 6,171,651 B1 | 1/2001 | Brown |
| 6,176,920 B1 | 1/2001 | Murphy et al. |
| 6,195,952 B1 | 3/2001 | Culpepper et al. |
| 6,204,214 B1 | 3/2001 | Singh et al. |
| 6,207,077 B1 | 3/2001 | Burnell-Jones et al. |
| 6,214,309 B1 | 4/2001 | Shaw et al. |
| 6,226,947 B1 | 5/2001 | Bado et al. |
| 6,228,215 B1 | 5/2001 | Hoffman, Jr. |
| 6,245,196 B1 | 6/2001 | Martin et al. |
| 6,248,812 B1 | 6/2001 | Symons et al. |
| 6,254,845 B1 | 7/2001 | Ohashi et al. |
| 6,254,981 B1 | 7/2001 | Castle |
| 6,258,456 B1 | 7/2001 | Meyer |
| 6,270,567 B1 | 8/2001 | Matsuo et al. |
| 6,276,107 B1 | 8/2001 | Waggoner et al. |
| 6,277,189 B1 | 8/2001 | Chugh |
| 6,290,769 B1 | 9/2001 | Carkner |
| 6,295,777 B1 | 10/2001 | Hunter et al. |
| 6,298,626 B2 | 10/2001 | Rudden |
| 6,308,486 B1 | 10/2001 | Medland et al. |
| 6,315,489 B1 | 11/2001 | Watanabe et al. |
| 6,316,087 B1 | 11/2001 | Lehan |
| 6,319,456 B1 | 11/2001 | Gilbert et al. |
| 6,324,807 B1 | 12/2001 | Ishiko et al. |
| 6,325,853 B1 | 12/2001 | Hogan et al. |
| 6,332,921 B1 | 12/2001 | Brothers et al. |
| 6,335,100 B1 | 1/2002 | Tominaga et al. |
| 6,344,654 B1 | 2/2002 | Lesko |
| 6,346,146 B1 | 2/2002 | Duselis et al. |
| 6,346,165 B1 | 2/2002 | Markessini et al. |
| 6,352,952 B1 | 3/2002 | Jardine et al. |
| 6,355,100 B1 | 3/2002 | Hamabe et al. |
| 6,357,193 B1 | 3/2002 | Morris |
| 6,360,563 B1 | 3/2002 | Gerhardt et al. |
| 6,365,081 B1 | 4/2002 | Beck |
| 6,367,208 B1 | 4/2002 | Campbell et al. |
| 6,367,220 B1 | 4/2002 | Krause et al. |
| 6,367,288 B1 | 4/2002 | Lindner et al. |
| 6,372,694 B1 | 4/2002 | Osinga et al. |
| 6,375,853 B1 | 4/2002 | Yoon |
| 6,387,175 B1 | 5/2002 | Lynn et al. |
| 6,387,302 B1 | 5/2002 | Konya et al. |
| 6,415,574 B2 | 7/2002 | Beck |
| 6,419,788 B1 | 7/2002 | Wingerson |
| 6,421,973 B1 | 7/2002 | Gregg et al. |
| 6,423,167 B1 | 7/2002 | Palmer et al. |
| 6,425,218 B1 | 7/2002 | Doyon et al. |
| 6,430,885 B1 | 8/2002 | Ito et al. |
| 6,432,212 B1 | 8/2002 | Hirose et al. |
| 6,436,485 B1 | 8/2002 | Sedlmeyr et al. |
| 6,444,162 B1 | 9/2002 | Anshits et al. |
| 6,444,316 B1 | 9/2002 | Reddy et al. |
| 6,461,988 B2 | 10/2002 | Budd et al. |
| 6,475,275 B1 | 11/2002 | Nebesnak et al. |
| 6,482,258 B2 | 11/2002 | Styron |
| 6,485,561 B1 | 11/2002 | Dattel |
| 6,486,084 B2 | 11/2002 | Oda et al. |
| 6,488,762 B1 | 12/2002 | Shi |
| 6,488,792 B2 | 12/2002 | Mathieu et al. |
| 6,506,248 B1 | 1/2003 | Duselis et al. |
| 6,506,819 B1 | 1/2003 | Shukla et al. |
| 6,510,667 B1 | 1/2003 | Cottier et al. |
| 6,512,132 B2 | 1/2003 | Isoda et al. |
| 6,514,624 B2 | 2/2003 | Takemoto et al. |
| 6,516,580 B1 | 2/2003 | Maietta |
| 6,526,715 B2 | 3/2003 | Kaneko et al. |
| 6,526,717 B2 | 3/2003 | Waggoner et al. |
| 6,526,751 B1 | 3/2003 | Moeckel |
| 6,528,151 B1 | 3/2003 | Shah et al. |
| 6,531,189 B1 | 3/2003 | Blatter et al. |
| 6,531,222 B1 | 3/2003 | Tanaka et al. |
| 6,533,848 B1 | 3/2003 | Robl et al. |
| 6,539,643 B1 | 4/2003 | Gleeson |
| 6,541,544 B1 | 4/2003 | Hart et al. |
| 6,550,203 B1 | 4/2003 | Little |
| 6,550,210 B1 | 4/2003 | Levine et al. |
| 6,551,567 B2 | 4/2003 | Konya et al. |
| 6,551,694 B1 | 4/2003 | Imamichi et al. |
| 6,562,444 B1 | 5/2003 | Gleeson et al. |
| 6,562,743 B1 | 5/2003 | Cook et al. |
| 6,564,520 B1 * | 5/2003 | Starke et al. ............... 52/302.1 |
| 6,572,697 B2 | 6/2003 | Gleeson et al. |
| 6,572,698 B1 | 6/2003 | Ko |
| 6,582,819 B2 | 6/2003 | McDaniel et al. |
| 6,605,148 B2 | 8/2003 | Shirakawa et al. |
| 6,610,358 B1 | 8/2003 | Williams et al. |
| 6,613,424 B1 | 9/2003 | Putt et al. |
| 6,620,487 B1 | 9/2003 | Tonyan et al. |
| 6,626,947 B2 | 9/2003 | Lester et al. |
| 6,626,991 B1 | 9/2003 | Drochon et al. |
| 6,630,417 B2 | 10/2003 | Kawai et al. |
| 6,641,658 B1 | 11/2003 | Dubey |
| 6,644,162 B1 | 11/2003 | Temple et al. |
| 6,645,289 B2 | 11/2003 | Sobolev et al. |
| 6,648,961 B2 | 11/2003 | Brothers et al. |
| 6,656,265 B1 | 12/2003 | Garnier et al. |
| 6,660,077 B2 | 12/2003 | De Buen-Unna et al. |
| 6,660,078 B2 | 12/2003 | Brothers et al. |

(56) References Cited

U.S. PATENT DOCUMENTS

| | | |
|---|---|---|
| 6,676,744 B2 | 1/2004 | Merkley et al. |
| 6,676,745 B2 | 1/2004 | Merkley et al. |
| 6,679,011 B2 | 1/2004 | Beck et al. |
| 6,682,595 B1 | 1/2004 | Barbour |
| 6,689,286 B2 | 2/2004 | Wilde et al. |
| 6,689,451 B1 | 2/2004 | Peng et al. |
| 6,692,564 B2 | 2/2004 | Hofmann et al. |
| 6,692,570 B2 | 2/2004 | Cottier et al. |
| 6,699,576 B2 | 3/2004 | Peng et al. |
| 6,706,794 B1 | 3/2004 | Tsuda et al. |
| D489,137 S | 4/2004 | Eichner et al. |
| 6,719,878 B1 | 4/2004 | Svedman et al. |
| D489,463 S | 5/2004 | Barnett |
| 6,737,008 B2 | 5/2004 | Gilbert et al. |
| D492,424 S | 6/2004 | Barnett |
| 6,749,897 B2 | 6/2004 | Naji et al. |
| 6,760,978 B2 | 7/2004 | Gleeson |
| 6,769,215 B1 * | 8/2004 | Carkner .................. 52/411 |
| 6,770,576 B2 | 8/2004 | Cook et al. |
| 6,777,103 B2 | 8/2004 | Merkley et al. |
| 6,787,486 B1 * | 9/2004 | Gregg et al. .................. 442/42 |
| 6,809,131 B2 | 10/2004 | Li et al. |
| 6,811,603 B2 | 11/2004 | Brothers et al. |
| 6,814,798 B2 | 11/2004 | Vijn et al. |
| 6,824,605 B2 | 11/2004 | De Buen-Unna et al. |
| 6,824,715 B2 | 11/2004 | Cottier et al. |
| 6,832,652 B1 | 12/2004 | Dillenbeck et al. |
| 6,837,452 B2 | 1/2005 | Dezutter et al. |
| 6,851,224 B2 * | 2/2005 | Lehnert .................. 52/2.22 |
| 6,872,246 B2 | 3/2005 | Merkley et al. |
| 6,875,503 B1 | 4/2005 | Famy et al. |
| 6,893,751 B2 | 5/2005 | Naji et al. |
| 6,898,917 B2 * | 5/2005 | Durning et al. ............ 52/746.1 |
| 6,901,713 B2 | 6/2005 | Axsom |
| 6,902,002 B1 | 6/2005 | Chatterji et al. |
| 6,902,797 B2 | 6/2005 | Pollock et al. |
| 6,913,819 B2 | 7/2005 | Wallner |
| 6,933,038 B2 | 8/2005 | Nanko et al. |
| 6,941,720 B2 | 9/2005 | DeFord et al. |
| 6,942,726 B2 | 9/2005 | Cook et al. |
| 6,969,422 B2 | 11/2005 | Mazany et al. |
| 7,028,436 B2 | 4/2006 | Bezubic, Jr. |
| 7,081,184 B2 | 7/2006 | Wester et al. |
| 7,089,709 B2 | 8/2006 | Waggoner |
| 7,112,549 B2 | 9/2006 | Yoshitomi et al. |
| 7,128,965 B2 | 10/2006 | Famy et al. |
| 7,147,055 B2 | 12/2006 | Brothers et al. |
| 7,155,866 B2 | 1/2007 | Bezubic, Jr. et al. |
| 7,191,570 B1 | 3/2007 | Eaton et al. |
| 7,219,479 B2 * | 5/2007 | Durning et al. ............ 52/746.1 |
| 7,226,525 B2 | 6/2007 | Vrbanac et al. |
| 7,300,546 B2 | 11/2007 | Jewell et al. |
| 7,300,892 B2 * | 11/2007 | Porter .................. 442/79 |
| 7,325,325 B2 | 2/2008 | Gleeson |
| 7,338,702 B2 | 3/2008 | Swales et al. |
| 7,344,593 B2 | 3/2008 | Luo et al. |
| 7,396,402 B2 | 7/2008 | Naji et al. |
| 7,419,544 B2 | 9/2008 | Naji et al. |
| 7,455,727 B2 | 11/2008 | Trevethick |
| 7,553,780 B2 * | 6/2009 | Smith .................. 442/86 |
| 7,625,827 B2 * | 12/2009 | Egan et al. .................. 442/20 |
| 7,846,278 B2 * | 12/2010 | Porter .................. 156/39 |
| 8,007,886 B2 * | 8/2011 | Tierney et al. ............ 428/40.1 |
| 8,092,858 B2 * | 1/2012 | Smith .................. 427/180 |
| 2001/0006336 A1 | 7/2001 | Yi et al. |
| 2001/0043996 A1 | 11/2001 | Yamada et al. |
| 2001/0047741 A1 | 12/2001 | Gleeson et al. |
| 2002/0004111 A1 | 1/2002 | Matsubara et al. |
| 2002/0007926 A1 | 1/2002 | Jewell et al. |
| 2002/0007927 A1 | 1/2002 | Vahatalo et al. |
| 2002/0025436 A1 | 2/2002 | Meyer |
| 2002/0043996 A1 | 4/2002 | Iwamoto |
| 2002/0051892 A1 | 5/2002 | Laks et al. |
| 2002/0059886 A1 | 5/2002 | Merkley et al. |
| 2002/0069791 A1 | 6/2002 | Merkley et al. |
| 2002/0088584 A1 | 7/2002 | Merkley et al. |
| 2002/0100249 A1 | 8/2002 | Peng et al. |
| 2002/0112827 A1 | 8/2002 | Merkley et al. |
| 2002/0114888 A1 | 8/2002 | Magliocca |
| 2002/0121229 A1 | 9/2002 | Jardine et al. |
| 2002/0139082 A1 | 10/2002 | DeFord et al. |
| 2002/0166479 A1 | 11/2002 | Jiang |
| 2002/0170466 A1 | 11/2002 | Naji et al. |
| 2002/0170467 A1 | 11/2002 | Naji et al. |
| 2002/0170468 A1 | 11/2002 | Luo et al. |
| 2002/0175126 A1 | 11/2002 | Naji et al. |
| 2002/0179219 A1 | 12/2002 | Naji et al. |
| 2002/0189499 A1 | 12/2002 | Naji et al. |
| 2002/0189500 A1 | 12/2002 | Naji et al. |
| 2002/0192510 A1 | 12/2002 | Naji et al. |
| 2003/0000424 A1 | 1/2003 | Naji et al. |
| 2003/0046891 A1 | 3/2003 | Colada et al. |
| 2003/0054123 A1 | 3/2003 | Black et al. |
| 2003/0056458 A1 | 3/2003 | Black et al. |
| 2003/0089061 A1 | 5/2003 | DeFord et al. |
| 2003/0100434 A1 | 5/2003 | Yoshitomi et al. |
| 2003/0129323 A1 | 7/2003 | Dornieden et al. |
| 2003/0148039 A1 | 8/2003 | Blum et al. |
| 2003/0164119 A1 | 9/2003 | Naji et al. |
| 2003/0165624 A1 | 9/2003 | Naji et al. |
| 2003/0172606 A1 | 9/2003 | Anderson |
| 2003/0177955 A1 | 9/2003 | Vijn et al. |
| 2003/0200721 A1 | 10/2003 | Gleeson et al. |
| 2003/0205172 A1 | 11/2003 | Gleeson et al. |
| 2003/0213568 A1 | 11/2003 | Wester et al. |
| 2003/0213569 A1 | 11/2003 | Wester et al. |
| 2003/0213570 A1 | 11/2003 | Vrbanac et al. |
| 2003/0213572 A1 | 11/2003 | Vrbanac et al. |
| 2004/0028909 A1 | 2/2004 | Hodgson et al. |
| 2004/0043217 A1 | 3/2004 | Dezutter et al. |
| 2004/0043686 A1 | 3/2004 | Batdorf |
| 2004/0079260 A1 | 4/2004 | Datta et al. |
| 2004/0080063 A1 | 4/2004 | Datta et al. |
| 2004/0081827 A1 | 4/2004 | Datta et al. |
| 2004/0083677 A1 | 5/2004 | Bezubic et al. |
| 2004/0099982 A1 | 5/2004 | Sirola et al. |
| 2004/0103610 A1 | 6/2004 | Axsom |
| 2004/0132843 A1 | 7/2004 | Baumgart et al. |
| 2004/0139676 A1 | 7/2004 | Knauseder |
| 2004/0145078 A1 | 7/2004 | Merkley et al. |
| 2004/0159066 A1 | 8/2004 | Thiers et al. |
| 2004/0163331 A1 | 8/2004 | Peng et al. |
| 2004/0168615 A1 | 9/2004 | Luo et al. |
| 2004/0170873 A1 * | 9/2004 | Smith .................. 428/703 |
| 2004/0211342 A1 | 10/2004 | Sprouts et al. |
| 2004/0220317 A1 | 11/2004 | Lorah et al. |
| 2004/0262801 A1 | 12/2004 | Hojaji et al. |
| 2005/0000172 A1 | 1/2005 | Anderson |
| 2005/0005821 A1 | 1/2005 | Colombet et al. |
| 2005/0011412 A1 | 1/2005 | Vijn et al. |
| 2005/0016423 A1 | 1/2005 | Merkley et al. |
| 2005/0045067 A1 | 3/2005 | Naji et al. |
| 2005/0072056 A1 | 4/2005 | Famy et al. |
| 2005/0126430 A1 | 6/2005 | Lightner et al. |
| 2005/0138865 A1 | 6/2005 | Gleeson et al. |
| 2005/0176321 A1 * | 8/2005 | Crette et al. .................. 442/103 |
| 2005/0208285 A1 | 9/2005 | Lyons et al. |
| 2005/0208287 A1 | 9/2005 | Naji et al. |
| 2005/0210790 A1 | 9/2005 | Wallner |
| 2005/0235883 A1 | 10/2005 | Merkley et al. |
| 2005/0262799 A1 | 12/2005 | Gleeson et al. |
| 2005/0284339 A1 | 12/2005 | Brunton et al. |
| 2006/0010800 A1 | 1/2006 | Bezubic |
| 2006/0024480 A1 | 2/2006 | Lyons et al. |
| 2006/0107872 A1 | 5/2006 | Chen |
| 2006/0147681 A1 | 7/2006 | Dubey |
| 2006/0168906 A1 | 8/2006 | Tonyan et al. |
| 2006/0182946 A1 | 8/2006 | Zarb et al. |
| 2006/0260237 A1 * | 11/2006 | Griffin et al. .................. 52/409 |
| 2006/0288909 A1 | 12/2006 | Naji et al. |
| 2007/0022913 A1 | 2/2007 | Wang et al. |
| 2007/0077436 A1 | 4/2007 | Naji et al. |
| 2007/0110981 A1 | 5/2007 | Killilea et al. |
| 2007/0131145 A1 | 6/2007 | Biscan et al. |

(56) References Cited

U.S. PATENT DOCUMENTS

| | | | |
|---|---|---|---|
| 2007/0186822 A1 | 8/2007 | Utagaki et al. | |
| 2007/0209554 A1 | 9/2007 | Garcia Luna et al. | |
| 2007/0246864 A1 | 10/2007 | Utagaki et al. | |
| 2007/0261607 A1 | 11/2007 | Utagaki et al. | |
| 2008/0022627 A1 | 1/2008 | Gleeson et al. | |
| 2008/0072795 A1 | 3/2008 | Utagaki et al. | |
| 2008/0072796 A1 | 3/2008 | Utagaki et al. | |
| 2008/0095692 A1 | 4/2008 | Pham | |
| 2008/0096018 A1 | 4/2008 | Zhang et al. | |
| 2008/0104918 A1 | 5/2008 | Gleeson et al. | |
| 2008/0157428 A1 | 7/2008 | Utagaki et al. | |
| 2008/0163582 A1 | 7/2008 | Trevethick | |
| 2008/0176057 A1 | 7/2008 | Ukai | |
| 2008/0178771 A1 | 7/2008 | Utagaki et al. | |
| 2008/0190062 A1 | 8/2008 | Engbrecht et al. | |
| 2008/0191165 A1 | 8/2008 | Nakagawa | |
| 2008/0199677 A1 | 8/2008 | Ukai | |
| 2008/0203365 A1 | 8/2008 | Gleeson et al. | |
| 2008/0311346 A1 | 12/2008 | Ohno | |
| 2009/0025897 A1 | 1/2009 | Aizawa | |
| 2009/0076196 A1 | 3/2009 | Hojaji | |
| 2009/0090276 A1 | 4/2009 | Feng et al. | |
| 2009/0156385 A1 | 6/2009 | Biscan et al. | |
| 2009/0223618 A1* | 9/2009 | Smith | 156/45 |
| 2009/0272058 A1* | 11/2009 | Duselis et al. | 52/309.17 |
| 2010/0221972 A1* | 9/2010 | Soane | 442/327 |
| 2010/0252184 A1* | 10/2010 | Morimoto et al. | 156/241 |

FOREIGN PATENT DOCUMENTS

| | | |
|---|---|---|
| AR | 206890 | 8/1976 |
| AR | 227376 | 10/1982 |
| AR | 228671 A1 | 3/1983 |
| AR | 291.988 | 1/1984 |
| AR | 240667 | 8/1990 |
| AR | 250022 | 7/1996 |
| AR | 015457 A1 | 9/1998 |
| AR | 014046 A1 | 11/1998 |
| AR | 014702 A1 | 3/1999 |
| AR | 010221 | 6/2000 |
| AR | 012644 | 11/2000 |
| AT | 391131 B | 8/1990 |
| AU | 515151 | 3/1981 |
| AU | 198170389 | 10/1981 |
| AU | 8401582 | 2/1983 |
| AU | 8858982 | 3/1983 |
| AU | 44948/85 | 1/1986 |
| AU | 0552930 B2 | 6/1986 |
| AU | 55929/86 | 10/1986 |
| AU | 94035 S | 11/1986 |
| AU | 95878 S | 3/1987 |
| AU | 98800 S | 12/1987 |
| AU | 99683 S | 2/1988 |
| AU | 572111 B | 5/1988 |
| AU | 102662 S | 1/1989 |
| AU | 606344 | 1/1989 |
| AU | 103840 S | 5/1989 |
| AU | 104552 S | 8/1989 |
| AU | 108078 S | 7/1990 |
| AU | 616088 | 7/1990 |
| AU | 198946878 | 7/1990 |
| AU | 110320 S | 2/1991 |
| AU | 199176201 | 6/1992 |
| AU | 13067/92 A | 9/1992 |
| AU | 199215903 A | 4/1993 |
| AU | 117138 S | 5/1993 |
| AU | 118448 S | 10/1993 |
| AU | 118862 S | 11/1993 |
| AU | 643726 | 11/1993 |
| AU | 199340398 | 11/1993 |
| AU | 686135 | 11/1994 |
| AU | 677649 | 12/1994 |
| AU | 122634 S | 2/1995 |
| AU | 123141 S | 4/1995 |
| AU | 123142 S | 4/1995 |
| AU | 659400 | 5/1995 |
| AU | 681049 | 9/1996 |
| AU | 702630 | 11/1996 |
| AU | 130941 S | 8/1997 |
| AU | 132812 S | 2/1998 |
| AU | 732998 | 5/1998 |
| AU | 6292698 | 8/1998 |
| AU | 135097 S | 9/1998 |
| AU | 199869111 | 10/1998 |
| AU | 135557 S | 11/1998 |
| AU | 199879922 | 2/1999 |
| AU | 734095 | 3/1999 |
| AU | 137291 S | 5/1999 |
| AU | 9768198 | 5/1999 |
| AU | 199886116 | 5/1999 |
| AU | 137791 | 7/1999 |
| AU | 99/26061 | 9/1999 |
| AU | 714529 | 1/2000 |
| AU | 99/52711 | 3/2000 |
| AU | 11373/00-11373/00 | 5/2000 |
| AU | 140607 S | 5/2000 |
| AU | 200078733 | 5/2001 |
| AU | 200078752 | 5/2001 |
| AU | 200078753 | 5/2001 |
| AU | 200111200 | 5/2001 |
| AU | 746655 | 6/2001 |
| AU | 783430 | 6/2001 |
| AU | 200072012 | 6/2001 |
| AU | 200121275 | 6/2001 |
| AU | 735352 | 7/2001 |
| AU | 37683/01 | 9/2001 |
| AU | 2001250832 | 9/2001 |
| AU | 200143991 | 10/2001 |
| AU | 200053659 | 3/2002 |
| AU | 147568 S | 4/2002 |
| AU | 2001287356 | 4/2002 |
| AU | 2002211394 | 4/2002 |
| AU | 200218649 | 5/2002 |
| AU | 148485 S | 7/2002 |
| AU | 2002240552 B2 | 9/2002 |
| AU | 200223229 | 11/2002 |
| AU | 2002301228 | 2/2003 |
| AU | 2002301288 A1 | 2/2003 |
| AU | 2003901529 | 3/2003 |
| AU | 2002301041 | 6/2003 |
| AU | 2002301511 A1 | 6/2003 |
| AU | 2003204739 B2 | 7/2003 |
| AU | 152915 S | 8/2003 |
| AU | 153491 S | 10/2003 |
| AU | 153493 S | 10/2003 |
| AU | 153494 S | 10/2003 |
| AU | 153495 S | 10/2003 |
| AU | 153496 S | 10/2003 |
| AU | 2003100890 | 12/2003 |
| AU | 2003204418 | 12/2003 |
| AU | 2003238481 | 12/2003 |
| AU | 2003266828 | 4/2004 |
| AU | 2003257906 A1 | 7/2004 |
| AU | 2003271286 | 7/2004 |
| AU | 2004204092 | 7/2004 |
| AU | 2003268882 | 8/2004 |
| AU | 2005100347 | 5/2005 |
| AU | 2004200339 | 6/2005 |
| CA | 730345 | 3/1966 |
| CA | 1040859 | 10/1978 |
| CA | 1080601 A1 | 7/1980 |
| CA | 1084230 | 8/1980 |
| CA | 1177205 | 11/1984 |
| CA | 2242749 | 2/1999 |
| CA | 2313456 | 6/1999 |
| CA | 2405354 | 11/2001 |
| CH | 368918 A | 4/1963 |
| CH | 606674 A5 | 11/1978 |
| CH | 678882 | 11/1991 |
| CH | 684285 A5 | 8/1994 |
| CL | 32972 | 2/1980 |
| CL | 2346-01 | 9/2001 |
| CL | 2347-01 | 9/2001 |

(56) References Cited

FOREIGN PATENT DOCUMENTS

| | | |
|---|---|---|
| CL | 2352-01 | 9/2001 |
| CL | 2353-01 | 9/2001 |
| CL | 461-02 | 3/2002 |
| CL | 693-2004 | 1/2005 |
| CN | 1032332 A | 4/1989 |
| CN | 1052519 A | 6/1991 |
| CN | 2149444 Y | 12/1993 |
| CN | 1081168 A | 1/1994 |
| CN | 1087885 A | 6/1994 |
| CN | 2170342 Y | 6/1994 |
| CN | 1099089 A | 2/1995 |
| CN | 1160070 A | 9/1997 |
| CN | 1178202 A | 4/1998 |
| CN | 2281378 Y | 5/1998 |
| CN | 1199116 A | 11/1998 |
| CN | 1224701 | 8/1999 |
| CN | 1251358 A | 4/2000 |
| CN | 1061328 C | 1/2001 |
| CN | 2435455 Y | 6/2001 |
| CN | 1394167 A | 1/2003 |
| CN | 1500038 A | 5/2004 |
| CS | 222361 | 6/1983 |
| CZ | 283459 | 4/1998 |
| DE | 1952082 U | 12/1966 |
| DE | 2421380 A1 | 1/1975 |
| DE | 2344773 A1 | 3/1975 |
| DE | 2460879 A1 | 6/1976 |
| DE | 2460880 A1 | 6/1976 |
| DE | 2610998 A1 | 9/1977 |
| DE | 143936 | 9/1980 |
| DE | 3037220 A1 | 4/1982 |
| DE | 3046405 A1 | 9/1982 |
| DE | 3213521 A1 | 6/1983 |
| DE | 3210326 A1 | 9/1983 |
| DE | 3232106 A1 | 3/1984 |
| DE | 3308917 | 9/1984 |
| DE | 3314796 A1 | 10/1984 |
| DE | 3324671 A1 | 1/1985 |
| DE | 3505335 A1 | 8/1986 |
| DE | 3601736 A1 | 7/1987 |
| DE | 3711549 A1 | 10/1987 |
| DE | 3621010 A1 | 1/1988 |
| DE | 3743467 A1 | 7/1989 |
| DE | 3932176 A1 | 6/1990 |
| DE | 3908172 A1 | 9/1990 |
| DE | 3923800 A1 | 1/1991 |
| DE | 4004103 A1 | 8/1991 |
| DE | 4104919 A | 8/1992 |
| DE | 4229572 | 3/1993 |
| DE | 4209834 A1 | 9/1993 |
| DE | 4228338 A1 | 10/1993 |
| DE | 9403018 U1 | 5/1994 |
| DE | 4316666 C1 | 12/1994 |
| DE | 4410020 A1 | 9/1995 |
| DE | 19607081 A1 | 8/1997 |
| DE | 19654836 A1 | 6/1998 |
| DE | 19858342 C1 | 2/2000 |
| DE | 20006112 U1 | 7/2000 |
| DE | 19549535 C2 | 1/2001 |
| DE | 19962137 A1 | 6/2001 |
| DE | 20105063 U1 | 8/2001 |
| DE | 10044641 A1 | 3/2002 |
| DE | 10106888 A1 | 9/2002 |
| EP | 0007585 | 2/1980 |
| EP | 0012546 | 6/1980 |
| EP | 0021362 | 1/1981 |
| EP | 0033133 A1 | 8/1981 |
| EP | 0036275 A1 | 9/1981 |
| EP | 0049365 A2 | 4/1982 |
| EP | 0055504 | 7/1982 |
| EP | 0056263 | 7/1982 |
| EP | 0069095 | 1/1983 |
| EP | 0084951 A2 | 8/1983 |
| EP | 0102092 | 3/1984 |
| EP | 0103097 B1 | 3/1984 |
| EP | 0104540 A2 | 4/1984 |
| EP | 0127960 B1 | 12/1984 |
| EP | 0136790 A2 | 4/1985 |
| EP | 0147429 A1 | 7/1985 |
| EP | 0159046 A2 | 10/1985 |
| EP | 0159173 A2 | 10/1985 |
| EP | 0173553 A2 | 3/1986 |
| EP | 0184477 A1 | 6/1986 |
| EP | 0188471 A1 | 7/1986 |
| EP | 0220073 B1 | 4/1987 |
| EP | 0222339 A1 | 5/1987 |
| EP | 0242872 A1 | 10/1987 |
| EP | 0247817 A1 | 12/1987 |
| EP | 0263723 A2 | 4/1988 |
| EP | 0287962 A1 | 10/1988 |
| EP | 0297186 A1 | 1/1989 |
| EP | 0305209 A1 | 3/1989 |
| EP | 0314242 A1 | 5/1989 |
| EP | 0327351 A2 | 8/1989 |
| EP | 0328431 A1 | 8/1989 |
| EP | 0347092 A | 12/1989 |
| EP | 0359362 B1 | 3/1990 |
| EP | 0376334 | 7/1990 |
| EP | 0419657 | 4/1991 |
| EP | 0428431 A1 | 5/1991 |
| EP | 0430667 | 6/1991 |
| EP | 0430995 B1 | 6/1991 |
| EP | 0482810 A1 | 4/1992 |
| EP | 0484283 A1 | 5/1992 |
| EP | 0558239 A1 | 9/1993 |
| EP | 0564447 A1 | 10/1993 |
| EP | 0593779 A1 | 4/1994 |
| EP | 0601594 A1 | 6/1994 |
| EP | 0619227 B1 | 10/1994 |
| EP | 0619277 B1 | 10/1994 |
| EP | 0625618 A2 | 11/1994 |
| EP | 0678488 | 10/1995 |
| EP | 0683282 | 11/1995 |
| EP | 0708213 A1 | 4/1996 |
| EP | 0717675 | 6/1996 |
| EP | 0725044 A1 | 8/1996 |
| EP | 0754663 A1 | 1/1997 |
| EP | 0801037 B1 | 10/1997 |
| EP | 0803484 A1 | 10/1997 |
| EP | 0846666 B1 | 6/1998 |
| EP | 0846668 B1 | 6/1998 |
| EP | 0891954 B1 | 1/1999 |
| EP | 0931778 B1 | 7/1999 |
| EP | 0999232 B1 | 5/2000 |
| EP | 1052262 A2 | 11/2000 |
| EP | 1088800 A2 | 4/2001 |
| EP | 1094165 A2 | 4/2001 |
| EP | 1106236 B1 | 6/2001 |
| EP | 1144129 A1 | 10/2001 |
| EP | 1155794 A2 | 11/2001 |
| EP | 1156021 | 11/2001 |
| EP | 1160212 A1 | 12/2001 |
| EP | 1172341 | 1/2002 |
| EP | 1227199 A1 | 7/2002 |
| EP | 1246782 | 10/2002 |
| EP | 1334076 B1 | 8/2003 |
| EP | 1346964 A2 | 9/2003 |
| EP | 1556313 A1 | 7/2005 |
| EP | 1801278 A1 | 6/2007 |
| EP | 1891984 A1 | 2/2008 |
| EP | 1985671 A1 | 10/2008 |
| ES | 2033987 T3 | 4/1993 |
| FR | 895184 | 1/1945 |
| FR | 990242 A1 | 9/1951 |
| FR | 1557348 A | 2/1969 |
| FR | 2248246 A1 | 5/1975 |
| FR | 2405908 A1 | 5/1979 |
| FR | 2451428 A1 | 10/1980 |
| FR | 2451428 | 11/1980 |
| FR | 2512440 A1 | 3/1983 |
| FR | 2540160 A1 | 8/1984 |
| FR | 2562591 A1 | 10/1985 |
| FR | 2611432 A1 | 9/1988 |
| FR | 2624870 A1 | 6/1989 |

(56) References Cited

FOREIGN PATENT DOCUMENTS

| | | |
|---|---|---|
| FR | 2628775 A1 | 9/1989 |
| FR | 2671072 | 7/1992 |
| FR | 2702790 A1 | 9/1994 |
| GB | 22139 | 11/1901 |
| GB | 119182 | 9/1918 |
| GB | 413294 | 7/1934 |
| GB | 442098 | 2/1936 |
| GB | 449384 | 6/1936 |
| GB | 558239 | 12/1943 |
| GB | 558584 | 1/1944 |
| GB | 564447 | 9/1944 |
| GB | 682432 | 11/1952 |
| GB | 731597 | 6/1955 |
| GB | 0740145 | 11/1955 |
| GB | 743866 | 1/1956 |
| GB | 744070 | 2/1956 |
| GB | 752345 | 7/1956 |
| GB | 896910 | 5/1962 |
| GB | 1003850 | 9/1965 |
| GB | 1062410 | 3/1967 |
| GB | 1066768 | 4/1967 |
| GB | 1086311 | 10/1967 |
| GB | 1125825 | 9/1968 |
| GB | 1174902 | 12/1969 |
| GB | 1258288 | 12/1971 |
| GB | 1265471 | 3/1972 |
| GB | 1269357 | 4/1972 |
| GB | 1337129 | 11/1973 |
| GB | 1448320 | 9/1976 |
| GB | 1490711 | 11/1977 |
| GB | 1493202 | 11/1977 |
| GB | 1493203 | 11/1977 |
| GB | 1512084 | 5/1978 |
| GB | 1514239 | 6/1978 |
| GB | 1515521 | 6/1978 |
| GB | 1532922 | 11/1978 |
| GB | 1536663 | 12/1978 |
| GB | 1543460 | 4/1979 |
| GB | 2019386 | 10/1979 |
| GB | 2021186 A | 11/1979 |
| GB | 2025928 | 1/1980 |
| GB | 2041384 | 9/1980 |
| GB | 1577648 | 10/1980 |
| GB | 1584175 | 2/1981 |
| GB | 2064989 | 6/1981 |
| GB | 2067622 | 7/1981 |
| GB | 2075079 A | 11/1981 |
| GB | 1604910 | 12/1981 |
| GB | 2078611 A | 1/1982 |
| GB | 2080851 | 2/1982 |
| GB | 2083512 A | 3/1982 |
| GB | 2106527 | 4/1983 |
| GB | 2137977 | 10/1984 |
| GB | 2148871 | 6/1985 |
| GB | 2199857 A | 7/1988 |
| GB | 2230772 | 10/1990 |
| GB | 2248834 | 4/1992 |
| GB | 2252987 | 8/1992 |
| GB | 2256867 | 12/1992 |
| GB | 2276875 | 10/1994 |
| GB | 2307425 | 5/1997 |
| GB | 2330138 | 4/1999 |
| GB | 2340071 A | 2/2000 |
| GB | 2433497 A | 6/2007 |
| HU | 164419 | 2/1974 |
| HU | 173947 | 9/1979 |
| HU | 180773 | 4/1983 |
| HU | 31027 | 4/1984 |
| HU | 0895285-AO | 1/1990 |
| HU | 200511 B | 6/1990 |
| HU | 209836 B | 11/1994 |
| HU | 9602843-AO | 12/1996 |
| HU | 0001904 | 11/2000 |
| IT | 1311962 B1 | 3/2002 |
| JP | 21071968 | 1/1943 |
| JP | 49116445 U | 2/1973 |
| JP | 49046761 Y1 | 12/1974 |
| JP | 50095319 | 7/1975 |
| JP | 51-23229 | 6/1976 |
| JP | 52051719 | 4/1977 |
| JP | 52052429 | 4/1977 |
| JP | 53050229 | 5/1978 |
| JP | 54025927 A | 2/1979 |
| JP | 56130832 U | 3/1980 |
| JP | 55085756 A | 6/1980 |
| JP | 55095654 A | 7/1980 |
| JP | 55116684 | 9/1980 |
| JP | 55130847 A2 | 10/1980 |
| JP | 56014466 A | 2/1981 |
| JP | 56048413 | 5/1981 |
| JP | 57017452 A2 | 1/1982 |
| JP | 57058615 A | 4/1982 |
| JP | 56041881 U | 9/1982 |
| JP | 57156361 A2 | 9/1982 |
| JP | 57183344 A | 11/1982 |
| JP | 58000351 A | 1/1983 |
| JP | 58045008 | 3/1983 |
| JP | 58055034 A | 4/1983 |
| JP | 58059803 | 4/1983 |
| JP | 58110443 | 7/1983 |
| JP | 58149939 | 9/1983 |
| JP | 59045953 | 3/1984 |
| JP | 59107985 | 6/1984 |
| JP | 59203747 | 11/1984 |
| JP | 59217659 A | 12/1984 |
| JP | 60105715 U | 7/1985 |
| JP | 60135211 A | 7/1985 |
| JP | 60161381 | 8/1985 |
| JP | 60191074 | 9/1985 |
| JP | 60242242 A | 12/1985 |
| JP | 61019900 A | 1/1986 |
| JP | 61068967 A2 | 4/1986 |
| JP | 61141656 A | 6/1986 |
| JP | 61178462 A2 | 8/1986 |
| JP | 62036055 A2 | 2/1987 |
| JP | 62036056 A | 2/1987 |
| JP | 62037444 | 2/1987 |
| JP | 62207751 | 9/1987 |
| JP | 62235274 A | 10/1987 |
| JP | 88-052740 | 1/1988 |
| JP | 63008248 A | 1/1988 |
| JP | 6319636 U | 2/1988 |
| JP | 6330381 | 2/1988 |
| JP | 63107849 A | 5/1988 |
| JP | 63117939 | 5/1988 |
| JP | 63-31426 B2 | 6/1988 |
| JP | 63248751 A | 10/1988 |
| JP | 63257631 A | 10/1988 |
| JP | 63-47229 Y2 | 12/1988 |
| JP | 64-29843 A | 1/1989 |
| JP | 1029843 | 1/1989 |
| JP | 64020910 | 1/1989 |
| JP | 64022385 | 1/1989 |
| JP | 64-37478 A | 2/1989 |
| JP | 64-50541 U | 3/1989 |
| JP | 01141849 A2 | 6/1989 |
| JP | 1178658 | 7/1989 |
| JP | 01290402 A | 11/1989 |
| JP | 02192447 A | 7/1990 |
| JP | 1924781990 | 7/1990 |
| JP | 64-25200 | 8/1990 |
| JP | 2204566 A | 8/1990 |
| JP | 02236350 A | 9/1990 |
| JP | 02283646 A | 11/1990 |
| JP | 02289456 A2 | 11/1990 |
| JP | 2714135 A | 12/1990 |
| JP | 03016978 | 1/1991 |
| JP | 3-004654 | 2/1991 |
| JP | 01128748 U | 6/1991 |
| JP | 3063641 U | 6/1991 |
| JP | 3066338 U | 6/1991 |
| JP | 03208871 A | 9/1991 |
| JP | 03295843 | 12/1991 |
| JP | 92052746 | 12/1991 |

(56) References Cited

FOREIGN PATENT DOCUMENTS

| | | |  | |
|---|---|---|---|---|
| JP | 04002642 A | 1/1992 | | |
| JP | 92054171 | 1/1992 | | |
| JP | 4042875 A | 2/1992 | | |
| JP | 04055556 A | * 2/1992 | .............. | E04F 13/00 |
| JP | 04089340 | 3/1992 | | |
| JP | 04104945 | 4/1992 | | |
| JP | 04144949 | 5/1992 | | |
| JP | 4149352 | 5/1992 | | |
| JP | 4182333 | 6/1992 | | |
| JP | 04182335 A | 6/1992 | | |
| JP | 4114937 | 7/1992 | | |
| JP | 4193748 A | 7/1992 | | |
| JP | 4260645 A | 9/1992 | | |
| JP | 4292906 A | 10/1992 | | |
| JP | 04295072 A | 10/1992 | | |
| JP | 04300232 A2 | 10/1992 | | |
| JP | 04342746 A | 11/1992 | | |
| JP | 04349155 | 12/1992 | | |
| JP | 5001532 U | 1/1993 | | |
| JP | 5-10636 U | 2/1993 | | |
| JP | 05040473 A | 2/1993 | | |
| JP | 05044323 | 2/1993 | | |
| JP | 5065760 A | 3/1993 | | |
| JP | 5154816 A2 | 6/1993 | | |
| JP | 5177625 A2 | 7/1993 | | |
| JP | 05184246 A2 | 7/1993 | | |
| JP | 05186261 A | 7/1993 | | |
| JP | 5229859 | 9/1993 | | |
| JP | 2467261993 | 9/1993 | | |
| JP | 542192 | 10/1993 | | |
| JP | 05042192 Y2 | 10/1993 | | |
| JP | 05287234 | 11/1993 | | |
| JP | 06001648 | 1/1994 | | |
| JP | 06017621 B2 | 1/1994 | | |
| JP | 6023889 A | 2/1994 | | |
| JP | 06024821 | 2/1994 | | |
| JP | 06123158 A | 5/1994 | | |
| JP | 06127992 A | 5/1994 | | |
| JP | 06144911 | 5/1994 | | |
| JP | 06144912 A2 | 5/1994 | | |
| JP | 6-28563 Y2 | 8/1994 | | |
| JP | 06256053 A2 | 9/1994 | | |
| JP | 06258053 A | 9/1994 | | |
| JP | 6271371 | 9/1994 | | |
| JP | 06080264 B2 | 10/1994 | | |
| JP | 06278116 A | 10/1994 | | |
| JP | 6293578 A | 10/1994 | | |
| JP | 6341093 | 12/1994 | | |
| JP | 07010621 | 1/1995 | | |
| JP | 07024299 A | 1/1995 | | |
| JP | 07033502 A | 2/1995 | | |
| JP | 07041592 A2 | 2/1995 | | |
| JP | 07109165 A | 4/1995 | | |
| JP | 07165455 A | 6/1995 | | |
| JP | 07187734 | 7/1995 | | |
| JP | 07196348 | 8/1995 | | |
| JP | 7291701 A | 11/1995 | | |
| JP | 7291707 A | 11/1995 | | |
| JP | 07292846 A2 | 11/1995 | | |
| JP | 07315869 A | 12/1995 | | |
| JP | 08012405 A | 1/1996 | | |
| JP | 08012450 A2 | 1/1996 | | |
| JP | 8040758 A | 2/1996 | | |
| JP | 8067541 A | 3/1996 | | |
| JP | 08068184 A2 | 3/1996 | | |
| JP | 08073283 A | 3/1996 | | |
| JP | 08074377 | 3/1996 | | |
| JP | 2507028 Y2 | 5/1996 | | |
| JP | 08119708 | 5/1996 | | |
| JP | 08133864 A | 5/1996 | | |
| JP | 2508554 B2 | 6/1996 | | |
| JP | 08151246 A | 6/1996 | | |
| JP | 08169779 | 7/1996 | | |
| JP | 08175859 | 7/1996 | | |
| JP | 08217561 A | 8/1996 | | |
| JP | 09020526 A | 1/1997 | | |
| JP | 09052747 A2 | 2/1997 | | |
| JP | 2538120 Y2 | 3/1997 | | |
| JP | 09067174 | 3/1997 | | |
| JP | 09077543 | 3/1997 | | |
| JP | 09092895 | 4/1997 | | |
| JP | 09123340 | 5/1997 | | |
| JP | 9124327 | 5/1997 | | |
| JP | 09193120 | 7/1997 | | |
| JP | 9201561 A | 8/1997 | | |
| JP | 9217659 A | 8/1997 | | |
| JP | 9227200 A2 | 9/1997 | | |
| JP | 09255383 A | 9/1997 | | |
| JP | 11077650 A | 9/1997 | | |
| JP | 09296560 A | 11/1997 | | |
| JP | 10025841 A | 1/1998 | | |
| JP | 10036161 A | 2/1998 | | |
| JP | 10046741 A | 2/1998 | | |
| JP | 10095648 | 4/1998 | | |
| JP | 10095922 A2 | 4/1998 | | |
| JP | 10121693 A | 5/1998 | | |
| JP | 10152356 A | 6/1998 | | |
| JP | 10245925 A | 9/1998 | | |
| JP | 10330146 | 12/1998 | | |
| JP | 11010631 | 1/1999 | | |
| JP | 11092202 A | 4/1999 | | |
| JP | 11099512 A | 4/1999 | | |
| JP | 11116299 A | 4/1999 | | |
| JP | 11139859 | 5/1999 | | |
| JP | 11210203 | 8/1999 | | |
| JP | 11217918-11-217918 | 8/1999 | | |
| JP | 11241448 A | 9/1999 | | |
| JP | 11247307 | 9/1999 | | |
| JP | 11256683 | 9/1999 | | |
| JP | 11511110 | 9/1999 | | |
| JP | 11280172 | 10/1999 | | |
| JP | 3351461990 | 12/1999 | | |
| JP | 2000008581 | 1/2000 | | |
| JP | 2000043196 | 2/2000 | | |
| JP | 2000044367 A | 2/2000 | | |
| JP | 2000064554 A2 | 2/2000 | | |
| JP | 2000110272 | 4/2000 | | |
| JP | 2000119050 | 4/2000 | | |
| JP | 2000143307 A | 5/2000 | | |
| JP | 2000154612 A | 6/2000 | | |
| JP | 2000160057 A | 6/2000 | | |
| JP | 2000179104 A | 6/2000 | | |
| JP | 2000302498 | 10/2000 | | |
| JP | 2000302522 A | 10/2000 | | |
| JP | 2001026485 A | 1/2001 | | |
| JP | 2001163647 A | 6/2001 | | |
| JP | 2001240439 A | 9/2001 | | |
| JP | 2001240458 A | 9/2001 | | |
| JP | 2001300924 A | 10/2001 | | |
| JP | 2001316157 A2 | 11/2001 | | |
| JP | 2001316163 A | 11/2001 | | |
| JP | 2001335385 A | 12/2001 | | |
| JP | 2001336230 A | 12/2001 | | |
| JP | 3482852001 | 12/2001 | | |
| JP | 2002003248 | 1/2002 | | |
| JP | 2002047750 A | 2/2002 | | |
| JP | 2002053361 A2 | 2/2002 | | |
| JP | 2002097732 | 4/2002 | | |
| JP | 2002161623 A2 | 6/2002 | | |
| JP | 2002212494 A | 7/2002 | | |
| JP | 2002231865 A | 8/2002 | | |
| JP | 2002354091 A2 | 12/2002 | | |
| JP | 2002364091 A | 12/2002 | | |
| JP | 107812003 | 1/2003 | | |
| JP | 550642003 | 2/2003 | | |
| JP | 2003073756 A | 3/2003 | | |
| JP | 2003094419 A | 4/2003 | | |
| JP | 2003335560 | 11/2003 | | |
| JP | 2004027497 A | 1/2004 | | |
| JP | 2004231480 A | 8/2004 | | |
| JP | 2004314456 A | 11/2004 | | |
| JP | 2005034695 A2 | 2/2005 | | |
| KR | 920008773 B | 10/1992 | | |
| KR | 19940006957 | 4/1994 | | |

(56) References Cited

FOREIGN PATENT DOCUMENTS

| | | |
|---|---|---|
| KR | 9508587 | 8/1995 |
| KR | 1019950008587 B1 | 8/1995 |
| KR | 1019967005677 | 11/1996 |
| KR | 100231910 B1 | 9/1999 |
| KR | 200158855 Y1 | 10/1999 |
| KR | 200172372 Y1 | 3/2000 |
| KR | 2000014685 | 3/2000 |
| KR | 100274218 B1 | 12/2000 |
| KR | 2001053808 | 7/2001 |
| MX | 9604516 | 12/1997 |
| MY | 107883 A | 6/1996 |
| NO | 9901129 | 9/2000 |
| NZ | 19354 a | 9/1984 |
| NZ | 210395 | 11/1984 |
| NZ | 211265 | 2/1985 |
| NZ | 20119 | 10/1985 |
| NZ | 20120 | 10/1985 |
| NZ | 20844 | 11/1986 |
| NZ | 218315 | 2/1987 |
| NZ | 21875 | 4/1988 |
| NZ | 22705 | 7/1989 |
| NZ | 221389 | 12/1991 |
| NZ | 25267 | 6/1993 |
| NZ | 230209 | 12/1993 |
| NZ | 247463 | 12/1993 |
| NZ | 25838 | 4/1994 |
| NZ | 26065 | 7/1994 |
| NZ | 26066 | 7/1994 |
| NZ | 240533 | 7/1996 |
| NZ | 270310 | 12/1996 |
| NZ | 280409 | 6/1997 |
| NZ | 280235 | 9/1997 |
| NZ | 259493 | 10/1997 |
| NZ | 248942 | 11/1997 |
| NZ | 242960 | 12/1997 |
| NZ | 306382 | 2/1998 |
| NZ | 314544 | 6/1998 |
| NZ | 331553 | 1/2000 |
| NZ | 336159 | 3/2000 |
| NZ | 334899 | 4/2000 |
| NZ | 400643 | 4/2000 |
| NZ | 334918 | 8/2000 |
| NZ | 335529 | 12/2000 |
| NZ | 508055 | 12/2000 |
| NZ | 502017 | 1/2001 |
| NZ | 331336 | 4/2001 |
| NZ | 500215 | 6/2001 |
| NZ | 507846 | 4/2002 |
| NZ | 502004 | 8/2002 |
| NZ | 505799 | 2/2003 |
| NZ | 504881 | 3/2003 |
| NZ | 512028 | 7/2003 |
| NZ | 516912 | 7/2003 |
| NZ | 524520 | 9/2003 |
| NZ | 518988 | 10/2003 |
| NZ | 517658 | 11/2003 |
| NZ | 520286 | 5/2004 |
| NZ | 521491 | 6/2004 |
| NZ | 525507 | 9/2004 |
| NZ | 525328 | 2/2005 |
| NZ | 528304 | 4/2005 |
| NZ | 530605 | 6/2005 |
| NZ | 532182 | 12/2005 |
| NZ | 536129 | 2/2006 |
| PL | 154782 B1 | 9/1991 |
| PL | 170678 B1 | 1/1997 |
| PL | 106840 | 1/1999 |
| PL | 190446 B1 | 9/1999 |
| PL | 339671 A1 | 1/2001 |
| PL | 190627 B1 | 12/2005 |
| RU | 1606633 A1 | 11/1990 |
| RU | 2039019 C1 | 7/1995 |
| RU | 2161695 C2 | 1/2001 |
| RU | 2167485 C2 | 5/2001 |
| RU | 2168485 C1 | 6/2001 |
| RU | 2243189 C1 | 12/2004 |
| SE | 9604599-2 L | 6/1998 |
| SG | 97920847 | 11/1990 |
| SG | 92906122 | 10/1992 |
| SG | 97912869 | 4/1993 |
| SG | 93908341 | 9/1993 |
| SG | 95012084 | 1/1994 |
| SG | 96026257 | 4/1994 |
| SG | 96120035 | 4/1995 |
| SG | 97059547 | 5/1996 |
| SG | 98021017 | 9/1996 |
| SG | 98021751 | 9/1996 |
| SG | 98051485 | 2/1997 |
| SG | 97018402 | 5/1997 |
| SG | 98012917 | 6/1997 |
| SG | 99017030 | 10/1997 |
| SU | 240472 | 3/1969 |
| SU | 411054 | 1/1974 |
| SU | 587123 | 1/1978 |
| SU | 607813 | 5/1978 |
| SU | 655678 | 4/1979 |
| SU | 1114646 | 9/1984 |
| SU | 1571024 | 6/1990 |
| SU | 1650196 | 5/1991 |
| SU | 1668346 | 8/1991 |
| SU | 1724613 | 4/1992 |
| TW | 278536 | 6/1996 |
| TW | 278537 | 6/1996 |
| TW | 282800 | 8/1996 |
| TW | 408089 | 10/2000 |
| TW | 150027 | 2/2001 |
| TW | 255851 | 6/2006 |
| WO | WO-8100422 | 2/1981 |
| WO | WO-8102758 | 10/1981 |
| WO | WO-8203386 | 10/1982 |
| WO | WO-8301947 | 6/1983 |
| WO | WO-8404765 | 12/1984 |
| WO | WO-8500361 | 1/1985 |
| WO | WO-8502394 | 6/1985 |
| WO | WO-8503966 | 9/1985 |
| WO | WO-8600291 | 1/1986 |
| WO | WO-8700827 | 2/1987 |
| WO | WO-9002102 | 3/1990 |
| WO | WO-9008240 | 7/1990 |
| WO | WO-9101409 | 2/1991 |
| WO | WO-9111321 | 8/1991 |
| WO | WO-9114057 | 9/1991 |
| WO | WO-9114058 A1 | 9/1991 |
| WO | WO-9200251 | 1/1992 |
| WO | WO-9200927 A1 | 1/1992 |
| WO | WO-9210440 | 6/1992 |
| WO | WO-9217657 | 10/1992 |
| WO | WO-9306316 | 4/1993 |
| WO | WO-9312303 | 6/1993 |
| WO | WO-9321126 | 10/1993 |
| WO | WO-9324711 | 12/1993 |
| WO | WO-9419561 | 9/1994 |
| WO | WO-9507177 | 3/1995 |
| WO | WO-9520066 | 7/1995 |
| WO | WO-9526450 | 10/1995 |
| WO | WO-9607538 | 3/1996 |
| WO | WO-9614482 | 5/1996 |
| WO | WO-9617996 | 6/1996 |
| WO | WO-9640598 | 12/1996 |
| WO | WO-9707968 | 3/1997 |
| WO | WO-9708111 | 3/1997 |
| WO | WO-9708401 | 3/1997 |
| WO | WO-9721640 | 6/1997 |
| WO | WO-9723696 | 7/1997 |
| WO | WO-9725389 | 7/1997 |
| WO | WO-9727152 | 7/1997 |
| WO | WO-9728342 | 8/1997 |
| WO | WO-9731153 | 8/1997 |
| WO | WO-9803284 | 1/1998 |
| WO | WO-9810151 | 3/1998 |
| WO | WO-9812149 | 3/1998 |
| WO | WO-9816697 | 4/1998 |
| WO | WO-9818855 | 5/1998 |
| WO | WO-9827027 | 6/1998 |

(56) References Cited

FOREIGN PATENT DOCUMENTS

| | | |
|---|---|---|
| WO | WO-9829353 | 7/1998 |
| WO | WO-9832713 | 7/1998 |
| WO | WO 9845222 | 10/1998 |
| WO | WO-9908885 | 2/1999 |
| WO | WO-9910607 | 3/1999 |
| WO | WO-9913185 | 3/1999 |
| WO | WO-9922095 | 5/1999 |
| WO | WO-9931158 | 6/1999 |
| WO | WO-9935330 | 7/1999 |
| WO | WO-9943904 | 9/1999 |
| WO | WO-9964692 | 12/1999 |
| WO | WO-0000449 | 1/2000 |
| WO | WO-0008271 | 2/2000 |
| WO | WO-0014354 | 3/2000 |
| WO | WO-0021901 | 4/2000 |
| WO | WO-0048960 | 8/2000 |
| WO | WO-0055446 | 9/2000 |
| WO | WO-0063506 | 10/2000 |
| WO | WO-0065166 | 11/2000 |
| WO | WO-0071336 | 11/2000 |
| WO | WO-0116048 | 3/2001 |
| WO | WO-0124988 | 4/2001 |
| WO | WO-0125561 | 4/2001 |
| WO | WO-0125562 | 4/2001 |
| WO | WO-0126894 | 4/2001 |
| WO | WO-0130927 | 5/2001 |
| WO | WO-0136191 | 5/2001 |
| WO | WO-0143931 | 6/2001 |
| WO | WO-0149952 | 7/2001 |
| WO | WO-0151427 | 7/2001 |
| WO | WO-0159228 | 8/2001 |
| WO | WO-0165021 | 9/2001 |
| WO | WO-0166485 | 9/2001 |
| WO | WO-0168547 | 9/2001 |
| WO | WO-0168777 | 9/2001 |
| WO | WO-0172863 | 10/2001 |
| WO | WO-0173239 | 10/2001 |
| WO | WO-0181666 | 11/2001 |
| WO | WO-0202481 | 1/2002 |
| WO | WO-0212623 | 2/2002 |
| WO | WO-0218486 | 3/2002 |
| WO | WO-0226897 | 4/2002 |
| WO | WO-0227109 | 4/2002 |
| WO | WO-0228795 A | 4/2002 |
| WO | WO-0228796 | 4/2002 |
| WO | WO-0231287 | 4/2002 |
| WO | WO-0232830 | 4/2002 |
| WO | WO-0233164 | 4/2002 |
| WO | WO-0238518 | 5/2002 |
| WO | WO-0239039 | 5/2002 |
| WO | WO-0242064 A1 | 5/2002 |
| WO | WO-02055806 | 7/2002 |
| WO | WO-02070145 | 9/2002 |
| WO | WO-02070218 A1 | 9/2002 |
| WO | WO-02070247 | 9/2002 |
| WO | WO-02070421 | 9/2002 |
| WO | WO-02070425 | 9/2002 |
| WO | WO-02072499 | 9/2002 |
| WO | WO-02081839 | 10/2002 |
| WO | WO-02081840 | 10/2002 |
| WO | WO-02081841 | 10/2002 |
| WO | WO-02081842 | 10/2002 |
| WO | WO-02096824 | 12/2002 |
| WO | WO-03074193 | 9/2003 |
| WO | WO-03106365 | 12/2003 |
| WO | WO-2004011391 | 2/2004 |
| WO | WO-2004018090 A1 | 3/2004 |
| WO | WO-2004031093 | 4/2004 |
| WO | WO-2004033388 | 4/2004 |
| WO | WO-2004063113 | 7/2004 |
| WO | WO-2004087412 | 10/2004 |
| WO | WO-2004101137 A1 | 11/2004 |
| WO | WO-2005003478 | 1/2005 |
| WO | WO-2005019550 | 3/2005 |
| WO | WO-2005035900 | 4/2005 |
| WO | WO-2005068741 | 7/2005 |
| WO | WO-2005078210 | 8/2005 |
| WO | WO-2005083191 | 9/2005 |
| WO | WO-2006039762 | 4/2006 |
| WO | WO-2006056644 | 6/2006 |
| WO | WO-2006086842 | 8/2006 |
| WO | WO-2006091929 | 8/2006 |
| WO | WO-2006113379 | 10/2006 |
| WO | WO-2007005041 | 1/2007 |
| WO | WO-2007009935 | 1/2007 |
| WO | WO-2007067774 | 6/2007 |
| WO | WO-2007115379 | 10/2007 |
| WO | WO-2008066746 | 6/2008 |
| WO | WO-2008100777 | 8/2008 |

OTHER PUBLICATIONS

Submission in opposition proceeding of EP 1330571 entitled "Effect of the Extraction Temperature upon the COD value of a Cellulose Pulp." dated Aug. 1, 2008, 1 pg.

"Forming Handsheets for Physical Tests of Pulp," TAPI, T 205 sp-95, 1995, pp. 5-7.

"Glass" Corning Glass Works—reprinted version of the Encyclopedia of Chemical Technology (vol. 10) 2nd ed. (1955), pp. 542-543.

"Hardi-Plank and Surface Mold" article located at internet http://www.nefsi.org/wwwboard/messages/439.html (Jun. 13, 2003) 2 pgs.

"Moisture in Pulp, Paper and Paperboard," TAPPI, T 412 om-94, pp. 1-3, 1994.

"Pre-extraction of hemicelluloses and subsequent kraft pulping Part I: alkaline extraction." TAPPI Journal (Jun. 2008)6 pgs.

3M Company, "3M Material Safety Data Sheet 3M Glass Bubbles, Types K and S" (Apr. 10, 2006) 7 pgs.

Abo-El-Enein et al "Autoclaved Calcium Silicate Hydrates, I—Rates of Formation and Molar Composition," Il Cemento Mar. 1990, pp. 147-160.

Aitken, A. & Taylor, H.F.W., "Hydrothermal Reactions in Lime-Quartz Pastes" J. Appl. Chem., 10 (1960) 7.

Amaral, S.T., et al. "Passivation of Pure Iron in Alkaline Solution Containing Silicate and Sulphate," Corrosion Science, V.41., 1999, 747-758.

Ambriose J. et al; "Metakaoline Blended Cements: An Efficient Way to Improve GRC Durability and Ductility" Int. Congress GRC/87, 6th Biennial Congress of the GRCA, Oct. 20-23, 1987 Edinburgh, Scotland, pp. 19-24.

Ameron Coatings, Amercoat 288 Flexible Water-Borne Acrylic Membrane, Aug. 1999, 2 pgs.

Arai, Y. et al. "Crystal Shape and Size Controls of Xonotlite," Gypsum and Lime, No. 248, 1994, pp. 17-25.

Ardex, "Sheltercoat Facade, Shelter Waterproofing Membranes," Mar. 10, 2002, 1 pg.

Asbridge et al. "Effects of Metakaolin, Water/Binder Ratio and Interfacial Transition Zones on the Microhardness of Cement Mortars" Cement and Concrete Research 32 (2002) pp. 1365-1369.

Assarsson, G.O., "Hydrothermal Reactions Between Calcium Hydroxide and Muscovite and Feldspar at 120-220 oC," J. Phys. Chem., 64 (1960) pp. 626-632.

Badogiannis et al. "Metakaolin as a Main Cement Constituent. Exploitation of Poor Greek Kaolins" Cement & Concrete Composites 27 (2005) pp. 197-203.

Benitez et al. "Optimization Technique for Sewage Sludge Conditioning With Polymer and Skeleton Builders," Water Research (1994), 28(10), 2067-73.

Berry, Craig, "Determination of the Influence of Pulp Chemical Oxygen Demand on the Flexural Strength of Cured Fibercement" (11 pgs), submitted in opposition proceeding of EP1330571, Aug. 1, 2008.

Bessey, G.E. "Hydrated Calciurri Silicate Products Other Than Hydraulic Cements"—The Chemistry of Cements, edited by H.F.W. Taylor, Academic Press, vol. 2, 1964, pp. 101-133.

BGC Fibre Cement "Ceramic Tile Floor Underlay" Apr. 2002, (7 pgs.)

Bia (NZ) Consultation Document Jun. 2003 "Proposed Change to Building Code Clause E2 External Moisture".

(56) References Cited

OTHER PUBLICATIONS

Blankenburg et al, "Quality and Possible Use of Brown Coal Fly Ash of East Germany" Frieberger Forschungshefter C (1986), C 413, pp. 102-114.
Boddy et al. "Long-Term Testing of the Chloride-Penetration Resistance of Concrete Containing High-Reactivity Metakaolin" Cement and Concrete Research 31 (2001) pp. 759-765.
Celite Material Safety Data Sheet—dated Jul. 10, 1992.
Chan, C.F. et al. "Formation of 11 A Tobermorite from Mixtures of Lime and Colloidal Silica with Quartz" Cem. Concr. Res., 8 (1978) pp. 135-138.
Chapter 5, Asbestos Cement Products, In Asbestos and Certain Asbestos Products: A Report on the Supply of Asbestos and Certain Asbestos Products, Competition Commission, Southampton Row, London 1970-1975, pp. 25-40.
Chem Masters, "Polymer Coatings & Toppings—System Selection Guide" (www.ChemMasters.net), Oct. 15, 2008.
Chemical Abstract, vol. 90, No. 16, American Chemical Society, Columbus, US Apr. 16, 1979.
Chemical Abstracts "Lightweight cement moldings." American Chemical Society, Columbus, US, vol. 104:114971, XP000183799 ISSN: 0009-2258, Apr. 7, 1986.
Babachev et al "Plasticizing effect of aliphatic amines on cements" Build Sci Inst. Sofia Bulgaria; Epitoanyag; Chemical Abstracts on STN 24(11), 430-5 (1972).
Chemical Abstracts, No. 54763d, vol. 117, No. 6; American Chemical Society, Columbus, US, Aug. 10, 1992.
Chemical Abstracts, vol. 86, No. 18, American Chemical Society, Columbus, US, May 2, 1977; p. 303.
Chemical Abstracts No. 51915a, XP 000186251, "Building Materials with Improved Black Mold Resistance," vol. 94, No. 8, Columbus, Ohio; Feb. 23, 1981.
Chemical Abstracts, vol. 95, No. 16, American Chemical Society, Columbus, US, Oct. 19, 1981, p. 288.
Chemical Abstracts, vol. 95, No. 2, American Chemical Society, Columbus, US, Jul. 13, 1981, p. 282.
Chemical Abstracts, vol. 98, No. 22; American Chemical Society, Columbus, US; May 30, 1983, p. 312.
Chilean patent application No. 170-97 dated Dec. 5, 1997.
Chilean patent application No. 2673-97 dated Jan. 30, 1997.
Collier et al. "Encapsulation of Iron Hydroxide Floc in Composite Cement" Immobilisation Science Lab., Dept of Engineering Materials, 2004, (4 pgs).
Office action for U.S. Appl. No. 10/753,089 (2004/0168615) mailed Jan. 16, 2008.
Information Disclosure Statement for U.S. Appl. No. 10/753,089 (2004/0168615) filed Sep. 28, 2007 and Oct. 29, 2007.
Amendment for U.S. Appl. No. 10/753,089 (2004/0168615) filed Oct. 31, 2007.
Courard et al. "Durability of Mortars Modified with Metakaolin" Cement and Concrete Research 33 (2003) pp. 1473-1479.
Coutts, R.S.P., "From forest to factory to fabrication," in Fibre Reinforced Cement and Concrete, ed. R.N. Swamy, E & FN SPON, London, 1992, pp. 31 to 47.
CRC Handbook of Chemistry & Physics, 62nd ed., p. F-124 (1981-1982).
Crennan et al. "Autoclaved Lime-Quartz Materials," Cement and Concrete Research, vol. 7, 1977, pp. 493-502.
CSR RendaLine—External Wall Cladding System—Brochure, Jan. 2002, pp. 1-36.
Derwent No. XP002335289, Database WPI Section Ch, Week 198610 Derwent Publications Ltd., London, GB; AN, Jan. 28, 1986.
Derwent No. XP002159268, Database WPI, Section Ch, Week 23, Derwent Publications Ltd., London, GB, Apr. 25, 1977.
Derwent No. XP002159269, Database WPI, Section Ch, Week 23, Derwent Publications Ltd., London, GB, Apr. 27, 1977.
De Silva P.S. et al. "Hydration of Cements Based on Metakaolin: Thermochemistry" Adv. In Cem. Res., vol. 3, No. 12, (Oct. 1990), pp. 167-177.

Declaration by Bill Adams and accompanying documents, Weyerhauser, dated prior to Oct. 17, 1999.
Department of Building and Housing, "Compliance Document for NZ Bldg Code Clause E2," 2005.
Digital Fire Corporation "Do You Need to Know About Eutectics to Make a Good Glaze?" (4 pgs) website article located at http://www.digitalfire.ab.ca/cermat/education/119.php?PHPSESSID=1e2d7f3f3a24698394ecaae57ed3b06d5 dated Jul. 14, 2003.
Documents submitted by REDCO in opposition proceeding of EP 1330571 dated Aug. 1, 2008.
Drogowska, M. et al. "Influence of Anions on the Passivity Behavior of Copper in Alkaline Solutions," Surface and Coatings Technology, 1988, 383-400, V. 34.
Drozhzhin et al., "Technical Monitoring of Microspheres from Fly Ashes of Electric Power Stations in the Russian Federation" 2005 (8 pgs).
Duxson, et al. "The Thermal Evolution of Metakaolin Geopolymers: Part 2—Phase Stability and Structural Development" Journal of Non-Crystalline Solids 353 (2007), pp. 2186-2200.
Ekman et al., "Studies on the Behavior of Extractives in Mechanical Pulp Suspensions," The Institute of Paper Science and Technology; Jun. 1990.
Energy Seal "Elastomeric Wall Coatings" located at <http://www.energy-seal.com/es-home.nsf/products/everlast>; Aug. 14, 2004.
EPS Plaster Cladding Systems, Technical and Installation Manual, Rockcote Architectural Coatings (NZ) Limited, Mar. 2003.
Examination Report for EP 00980518.5 dated Jan. 5, 2005.
Extended European Search Report for EP 07008392.8, dated Oct. 8, 2007, 9 pp.
Extract from Webster's Third New International Dictionary of the English Language unabridged, ed Merriam-Webster Inc., Springfield, 1986.
Finnish Forest Industries Federal, "Mechanical Pulp Production" located at http://english.forestindustries.fi/products/pulp/mechanical.html, dated Nov. 10, 2004 (2 pgs).
Force 10 Caribbean "Custom Features" Engineered Building Systems (1999) 5 pgs.
Fortes-Revilla et al. "Modelling of Slaked Lime-Metakaolin Mortar Engineering Characteristics in Terms of Process Variables" Cement & Concrete Composites 28 (458-467) 2006.
Gehm, H.W., "New & Basic Research Approaches to Liquid Effluent Treatment" Paper Trade Journal, 142 (No. 16), 40-4, (1958) 46.
Gubka "Composition and Morphology of Cenospheres" located at: http://www.atom.nw.ru/rie/projects/gubka/properties/cenospheres.shtml, Jul. 11, 2006, 2 pgs.
Gypsum Association Manual, 14th Edition 1994, p. 33-34.
HARDIHOME Lap Siding with the Embossed EZ Line Alignment Aid, Mar. 2000.
Harper, S., et al. "Resin Extraction and Effects on Pulp Quality," Proceedings of the 54th Appita Annual Conference, Melbourne, Apr. 3-6, 2000, pp. 575-580.
Hawley's Condensed Chemical Dictionary, Fourteenth Edition, Revised by Richard J. Lewis, Sr., published by John Wiley & Sons, Inc. 2002, pp. 447, 624, 903-904.
Hawley's Condensed Chemical Dictionary, definition of "dispersing agent," Richard Lewis Sr., Twelfth Edition, Van Nostrand Reinhold, 1993, p. 435.
Hoar, T.P.,—"The Production and breakdown of the passivity of metals," Corrosion Science, vol. 7, 1967, pp. 341-355.
International Preliminary Examination Report for PCT/US00/31729 dated Feb. 21, 2002.
International Preliminary Examination Report for PCT/US01/01908 dated Apr. 6, 2002.
International Preliminary Examination Report for PCT/US02/10608 dated Feb. 14, 2003.
International Preliminary Examination Report for PCT/US02/10609 dated Apr. 22, 2003.
International Preliminary Examination Report for PCT/US02/10760 dated Feb. 3, 2003.
International Preliminary Examination Report for PCT/US04/19980 dated Jul. 27, 2005.

(56) References Cited

OTHER PUBLICATIONS

International Preliminary Examination Report for PCT/US02/10610 dated Feb. 7, 2003.
International Preliminary Examination Report for PCT/US00/27451 dated Dec. 7, 2001.
International Preliminary Examination Report for PCT/IB2005/050709 dated Feb. 7, 2006.
International Preliminary Report on Patentability and Written Opinion of the International Searching Authority for PCT/US2006/006799, dated Aug. 28, 2007, 11 pp.
International Preliminary Report on Patentability for PCT/US2005/007581 dated Jun. 19, 2007.
International Search Report for PCT/US02/10609 dated Aug. 1, 2002.
International Search Report for AU/2004/903567, dated Jul. 26, 2004.
International Search Report for PCT/AU00/00320 dated May 31, 2000.
International Search Report for PCT/AU03/01315 dated Nov. 12, 2003.
International Search Report for PCT/AU97/00692 dated Dec. 3, 1997.
International Search Report for PCT/IB2005/050709 dated May 23, 2005.
International Search Report for PCT/US 02/10608 dated Aug. 5, 2002.
International Search Report for PCT/US 02/10610 dated Aug. 5, 2002.
International Search Report for PCT/US 02/10760 dated Aug. 5, 2002.
International Search Report for PCT/US00/27451 dated Feb. 2, 2001.
International Search Report for PCT/US00/31729 dated Feb. 21, 2001.
International Search Report for PCT/US01/01908 dated Mar. 19, 2001.
International Search Report for PCT/US02/10609 dated Aug. 7, 2002.
International Search Report for PCT/US05/007581 dated Aug. 3, 2005.
International Search Report for PCT/US2004/019980 dated Sep. 15, 2004.
International Search Report for PCT/US2005/000957, dated Jun. 16, 2005.
International Search Report for WO 02/028796 A2 (PCT/US01/42243) dated May 15, 2002.
Isu et al. "Influence on quartz particle size on the chemical & mechanical properties of autoclaved aerated concrete," Cement & Concrete R., vol. 25, 1995, p. 243.
James Hardie, "External Wall Cladding," Oct. 1990, 2 pgs.
James Hardie, "Primeline Weatherboards," Oct. 1996, 8 pgs.
Jianquan et al "Research on Water Resistant Performance of Modified Polymer Cement Composite Reinforced with Fiber," Mar. 2003.
Johnson, C.A. et al., "Leaching Behavior and Solubility—Controlling Solid Phases of Heavy Metals in Municipal Solid Waste Incinerator Ash," Waste Management, vol. 16 (1-3), 1996, p. 129-134.
Joshi, P.S., et al. "Passivation of Carbon Steel Alloy in De-oxygenated Alkaline pH Media," Corrosion Science, vol. 34(8), 1993, pp. 1367-1379.
Jubocid "Special Anti-Mildew Coatings" Sep. 2002, 4 pgs.
Kennedy, G.C.; Econ. Geol. 45[7]; 652 (1950).
Kolay, et al. "Physical, Chemical, Mineralogical, and Thermal Properties of Cenospheres From an Ash Lagoon" Dec. 29, 2000, pp. 539-542.
Kondo, R. et al., "Kinetics and Mechanism of Hydrothermal Reaction in Lime-Quartz-Water System" J. Ceram. Soc. Japan, 84 (1976) pp. 573-578.
Kondo, R., Int. Symp. "Kinetic Study on Hydrothermal Reaction Between Lime and Silica" Autoclaves Calcium Silicate Building Products, London, 1965 pp. 92-100.
Kuder, et al. "Extruded Fiber-Reinforced Composites for Building Enclosures" NSF Housing Research Agenda Workshop: Proceedings and Recommendations, Orlando, FL; Feb. 12-14, 2004, pp. 222-231.
Kuroki et al., "Cement-Bonded Board Industry and Market in Japan and New Technology Developments," 1995, pp. 105-112.
Letter from Sargent & Krahn reporting First Substantive Report for CL 653-2002 dated Apr. 1, 2005.
Letter from Sargent & Krahn reporting First Substantive Report for CL 656-2002 dated Apr. 11, 2005.
Letter from Sargent & Krahn reporting First Substantive Report for CL 655-2002 dated Jan. 31, 2005.
Letter to from Saint Gobain to EPO in opposition proceeding of EP 1330571 dated Aug. 1, 2008 (3 pgs).
Li et al. "Property Improvement of Portland Cement by Incorporating with Metakaolin and Slag" Cement and Concrete Research 33 (2003) 579-584.
Lin et al., "Improvements in the Durability of Cellulose Reinforced Cementitious Composites," Mechanisms of Chemical Degradation of Cement based systems, Proceedings of the Materials Research Society's Symposium of Mechanisms, Boston, Nov. 27-30, 1995.
Litigation documents corresponding to Civil Case Nos. SCVSS115246, 5:04-CV-00674-RT-SGL, 04-C-1621, 05-CV-44, and A2-04-152.
Locher, Friedrich W. "Fundamentals of Production and Application" VBT; 2000.
M.D. Campbell and R.S.P. Coutts, "Wood Fibre-Reinforced Cement Composites," in Journal of Materials Science, 15 (1980), pp. 1962-1970.
Mai et al., "Effects of Water and Bleaching on the Mechanical Properties of Cellulose Fiber Cements" Journal of Materials Science 18 (1983) pp. 2156-2162.
Mai et al., "Slow Crack Growth in Bleached Cellulose Fibre Cements" Journal of Materials Science Letters 3 (1984), pp. 127-130.
Mark, J.E., "Thermoset Elastomers" Applied Polymer Science 21st Century, (Clara D. Craver and Charles E. Carraher, Jr. ed., Elsevier), 2000, pp. 209-222.
MBT Middle East: Datasheets, Masterseal 300H, Jun. 2002.
Microspheres S.A., "What Are Cenospheres" at http://www.microspheres.co.za/contents.htm, printed Jul. 11, 2006, 5 pgs.
Muscovite Mica and Phlogopite Mica, from READE, internet article located at http://www.reade.com/Products/Minerals_and_Ores/mica.html, from Aug. 6, 2007.
Neithalath, Narayanan, et al "Acoustic Performance and Damping Behavior of Cellulose Cement Composites," Cement & Concrete Composites 25 (2003).
New Zealand Department of Building and Housing, "Non-Flush Finished Joints," Acceptable Solution E2/AS1 (extract from the New Zealand Building Code) Jul. 1, 2005, 1 pg.
Notice of Opposition of CL 653-2002 (dated Mar. 2003).
Notice of Opposition of CL 654-2002 (dated Sep. 2003).
Notice of Opposition of CL 655-2002 (dated Sep. 2003).
Notice of Opposition of CL 656-2002 (dated Oct. 2003).
Notification of Office Action for CN 00815911.4 dated Sep. 24, 2004.
Notification of Office Action for CN 02811074.9 dated Feb. 4, 2005.
Notification of Office Action for CN 02811168.0 dated Mar. 18, 2005.
Notification of Office Action for CN 02811237.7 dated Mar. 18, 2005.
Novakovsky, V.M., "Thermodynamic and Kinetic Causes of Passivity," Electrochimica Acta, vol. 10, 1965, pp. 353-365.
Omurtag, Y. et al. "Some Investigations on the Corrosion Characteristics on Fe—Si Alloys," Corrosion Science, vol. 10, 1970, pp. 225-231.
Notice of Opposition to EP-B-1330571 filed by Redco on Dec. 15, 2006.
Notice of Opposition to EP-B-1330571 filed by St. Gobain Materiaux dated Jan. 19, 2007.
Panels: Materials and Manufacturing Process, M5 Tunnel Specification, Jul. 24, 2001, 17 pgs.
Pawlowski et al, "Novel Raw Material for Producing Heat Insulating Materials," Silikattechni, 33(11), 1982, pp. 339-340.
PBS Distributors Ltd trade literature for Vent-Clad cladding system, Aug. 2003.

(56) References Cited

OTHER PUBLICATIONS

PCA (Portland Cement Assoc) article: "Concrete Homes—Fiber Cement Siding" website article printed 2005, 3 pgs.
Plaster Systems, Ltd., "Insulclad Cavity Based Exterior Plaster Cladding System Specification," Feb. 2004.
Plaster Systems, Ltd., "Insulclad Cavity Based Exterior Plaster Cladding System Specification," Oct. 2003.
Poon et al. "Rate of Pozzolanic Reaction of Metakaolin in High-Performance Cement Pastes" Cement and Concrete Research 31 (2001) pp. 1301-1306.
Ray A, et al., "Use of Dta to Determine the Effect of Mineralizers on the Cement-Quartz Hydrothermal Reactions" Thermochimica Acta 250 (1995) pp. 189-195.
Saikia et al. "Cementitious Properties of Metakaolin—Normal Portland Cement Mixture in the Presence of Petroleum Effluent Treatment Plant Sludge" Cement and Concrete Research 32 (2002), pp. 1717-1724.
Sauman et al; "Influence Explanation of Siliceous Materials Additive to Cement As Well As of Pastes Hydration and Their Treatment Temperature on the Lime Quantity Liberated by Rehydration" Il Cemento, vol. 3, 1978, pp. 343-350.
Scan-Test Method C 45:00, "COD and TOC Removable by Washing" Scandinavian Pulp, Paper and Board Testing Committee, Revised 2000.
Scan-Test Method CM 45:91, "Water-Soluble Organic Matter," Scandinavian Pulp, Paper and Board Testing Committee, (1991).
Sevcik V., "Mixture for Refractory Purposes," Database EPODOC, the Hague, NL; abstract XP002389199, (Oct. 15, 1997).
Shangai Building Materials, "Self-Leveling Elastic Water-Proofing Coating," Issue 6, 2000 (5 pgs).
Shapiro, A.D., et al., "Manufacture of Board Resistant to Biological Degradation" Bumazhnaya Promyshiennost 36, 12, XP-002335287, 1961.
Silica Fume, Cement Association of Canada, located at htt:/www.cennent.ca/cement.nsf/ep/07669ADF88663915852568A9005A7770?opendocument (dated Aug. 6, 2007), 2 pgs.
Singh, R., et al. "Stabilization of Natural Faujasite Zeolite: Possible Role of Alkaline Earth Metal Ions," Microporous and Mesoporous Materials, vol. 21, 1998, pp. 103-109.
Skaggs et al. "Applications of Rehological Modifiers and Super Plasticizers in Cementitious Systems," American Concrete Institute SP, SP-148, (1994), pp. 189-207.
Soroushian, Parviz "Development of Specialty Cellulose Fibers and Cementitious Matrices for Cellulose Fiber Reinforced Cement Composites" (1989).
Sphere Services Inc. "Cenospheres—Hollow Ceramic Microspheres" website article located at http://www.sphereservices.com/ceno.html dated May 15, 2007 (2 pgs) <http://www.sphereservices.com/ceno.html>.
STOANZ Trade literature, 2004.
STOANZ Trade literature, Nov. 2003.
Stolica, N.,"Pitting-Corrosion on Fe—Cr and Fe—Cr—Ni Alloys," Corrosion Science, vol. 9, 1969, pp. 455-470.
Stromberg, C.B. "Washing of Dissolved Organic Solids From Pulp" Paper Asia, Oct. 1994 pp. 32-39.
Stromberg, C.B., "Washing for Low Bleach Chemical Consumption," in Thomas W. Joyce (ed.), Environmental Issues: A TAPPI Press Anthology of Published Papers, TAPPI Press, Atlanta, 1990 pp. 230-238.
Sukhotin, A.M. et al. "The Passivity of Iron in Acid and Alkaline Solutions," Corrosion Science, vol. 5, 1965, pp. 393-407.
Supplemental European Search Report for EP 97943673 dated Mar. 27, 2001.
Tack, F.M. et al., "Metal Solubility as a Function of pH in a Contaminated Dredged Sediment Affected by Oxidation," Environmental Pollution, 1996, pp. 199-208, V.91.
Technical File by Louisiana-Pacific Samao, Inc. sent to Redco on May 5, 1999.
Technische Information, Disbocolor 494, Acryl-Schutz, Disbon, Apr. 1996, 6 pp.
Technisches Merkblatt 51.800, Betonschutz 800 seidenmatt, Jan. 1, 1988, 4 pgs.
Technology Education, "Glass" by Encyclopedia Britannica http://www.geocities.com/tech_ed_2000/industrial/manufacturing/glass/glass.htm dated May 15, 2007.
Thai MDF Board Co., Ltd "Beger Synotex Acrylic TM 100% Emulsion Paint" at: http://www.thaimdf.com/paint_roofpaint.htm, 2003, 2 pp.
Third Party Observation by Redco NV in EP Application No. 04700639.0 filed Aug. 23, 2006.
Letter filed in opposition proceeding of EP1330571 dated Aug. 1, 2008.
Tourky, A.R. et al., "Further Studies on the Effect of C-content on the Corrosion and Passivity of Fe," Corrosion Science, 1968, pp. 857-870, vol. 8.
Decision of Opposition in relation to Taiwanese Patent Application No. 85114421 (corresponding to US Patent No. 6,510,667), issued Aug. 3, 1998 (with Translation).
U.S. Appl. No. 11/816,379 entitled "Flooring Sheet and Modular Flooring System"; first-named inventor: James Gleeson, filed Aug. 15, 2007.
U.S. Appl. No. 10/070,218 entitled "Extrudable Cementitious Material;" first-named inventor: Peter Goodwin, filed Jul. 19, 2002.
U.S. Appl. No. 10/648,010 entitled "Synthetc Microspheres and Methods of Making Same;" first-named inventor: Datta, filed Aug. 25, 2003.
U.S. Appl. No. 10/977,344 entitled "Manufacture and Use of Engineered Carbide and Nitride Composites;" Inventor: Giang Biscan, filed Oct. 29, 2004.
U.S. Appl. No. 11/026,340 entitled "Methods and Formulations for Producing Low Density Products;" first-named inventor: Hojaji, filed Dec. 29, 2004 (abandoned Dec. 2005).
U.S. Appl. No. 10/873,723 entitled "Durable Building Article and Method of Making Same;", filed Jun. 21, 2004 (abandoned May 18, 2005).
U.S. Appl. No. 60/536,172 entitled "Composite Fiber Cement Article with Radiation Curable Component;" first-named inventor: Lyons, filed Jan. 12, 2004.
U.S. Appl. No. 60/417,076, filed Oct. 7, 2002; first-named inventor: Luo; entitled: Durable Medium Density Fibre Cement Composite.
Vermiculite Properties, The Vermiculite Association, http:/www.vermiculite.org/properties.htm (printed Aug. 8, 2007), 3 pgs.
Wattyl, "Granosite GranoSkin Decorative Membrane Datasheet 5.02," Jan. 6, 1999, 6 pgs.
Definition of "hollow" from Webster's II New Riverside University Dictionary (1984) p. 587.
Woods, Amy Lamb "Keeping a Lid on It: Asbestos-Cement Building materials" www.cr.nps.gov/hps/tps/recentpast/asbestosarticle.htm, Aug. 2000, 12 pgs.
Written Opinion for PCT/US01/42243 dated May 28, 2002.
Written Opinion of the International Searching Authority for PCT/US2004/019980 dated Dec. 20, 2005.
Xu et al. "Study on Particle Size Distribution and Chemical Activity of Mechanical Activity Fly Ash," Guisuanyan Tongbao, 22(2), (2003), p. 73-76.
Zhou, Ming "The Trial of Antisepsis and Mothproof on Rural Timber Structure Architectures," China Wood Industry, Issue 2, 1987, pp. 16-24.
Rozman et al., "Improvements of Fibreboard Properties through Fibre Activation with Silane," Intern. J. Polymeric Mater., vol. 32 (1996) pp. 247-257.
Certificate of Grant of Patent in copending Singapore Patent Application No. 200305728-8.
Decision of Appeal in relation to Taiwanese Patent Application No. 85114421 (corresponding to US Patent No. 6,510,667), issued Feb. 24, 1999 (with Translation).
Decision to Grant a Patent and an Examination Report for copending Japanese Application No. 2002-579593.
Decision to Grant for Patent and Preliminary Notice of Objection in copending Korean Application No. 10-2003-7013036.

(56) References Cited

OTHER PUBLICATIONS

Examination Reports in copending Chilean Application No. 656-02 (dated 2005 and 2006).
Examiner's First Report for copending Australian Patent Application No. 2002250516 dated Dec. 14, 2006.
Expert Declaration of Prof. Dr. Dahl, with CV (Jan. 28, 2009).
Expert Declaration of Prof. Dr. Roffael (Jan. 28, 2009).
Letters Patent for copending New Zealand Patent No. 528779.
Macdougall, F.H., Excerpt "Reactions in Heterogeneous Systems" Thermodynamics and Chemistry (1921), title page and p. 64.
Notice of Registration and two Office Actions in copending China Application No. 02811237.7.
Office Action mailed Oct. 5, 2005 in U.S. Appl. No. 10/117,401.
Office Action mailed Nov. 3, 2003 in U.S. Appl. No. 10/117,401.
Office Action mailed Dec. 12, 2006 in U.S. Appl. No. 10/117,401.
Office Action mailed Mar. 14, 2005 in U.S. Appl. No. 10/117,401.
Office Action mailed Mar. 27, 2006 in U.S. Appl. No. 10/117,401.
Office Action mailed Jul. 13, 2007 in U.S. Appl. No. 10/117,401.
Office Action mailed Aug. 25, 2004 in U.S. Appl. No. 10/117,401.
EPO Examination Reports in Application No. 02-719-435.6.
U.S. Appl. No. 10/530,770 entitled "Durable Medium-Density Fibre Cement Composite", filed Oct. 6, 2005; Inventor: Basil Naji, et al.
U.S. Appl. No. 10/551,873 entitled "Durable High Performance Fibre Cement Product and Method of Manufacture", filed Sep. 30, 2005; Inventor: Joseph Emmanual Zarb, et al.
Technology Education—"Glass" by Encyclopedia Britannica, from http://www.geocities.com/tech_ed_2000/industrial/manufacturing/glass/glass.htm, dated May 15, 2007.
Derwent Abstract Accession No. 2009-E28129, CN 101337822, published Jan. 7, 2009.
Derwent Abstract Accession No. 1992-401310, HU 60701, published Oct. 28, 1992.
Derwent Acc No. 1981-00856D for FR 2451428, published Nov. 14, 1980.
Derwent Acc No. 1991-295696 for WO 91/14058 published Sep. 19, 1991.
British Board of Agreement, Certificate No. 84/1330 for Duracem Slates, dated Jun. 26, 1984.
British Board of Agreement, Certificate No. 96/3283 for Eternit 2000 Slates and Fittings ,dated Sep. 20, 1996.
Eternit Gevel, Multiboard 38xx Product Information (with translations), dated Mar. 18, 2002 and Sep. 14, 2001 and Jun. 13, 2003.
Kalbskopf R, et al., "Durability of Fiber-cement Roofing Products," from the International Inorganic Bonded Wood and Fiber Composites Conference, Sep. 2002, 7 pp.
Redco NV, Letter with translation to European Patent Office filed with opposition of EP 1300571, dated Aug. 1, 2008.

\* cited by examiner

SURFACE SEALED REINFORCED BUILDING ELEMENT

FIELD OF THE INVENTION

The present invention relates to a reinforced and preferably surface sealed building element and to a method and apparatus for the manufacture of these elements.

The invention was developed primarily for building sheet materials made predominantly from fibre cement and will be described hereinafter with reference to this application. However, it will be clear that the invention is not limited to this particular use and can readily be adapted to other building products and/or elements made from different materials.

BACKGROUND OF THE INVENTION

Any discussion of the prior art throughout the specification should in no way be considered as an admission that such prior art is widely known or forms part of common general knowledge in the field.

Selection of building materials for a given use depends largely upon the nature of the intended application and in many cases each of the products available represent a compromise between strength characteristics, durability and ease of installation, the latter being largely determined by workability characteristics such as ease of cutting, fixing and handling.

For example, natural timber has good inherent bending strength characteristics making it easy to transport and suitable for use in a variety of load bearing applications. However, it is generally fairly costly and lacks durability, particularly in damp or wet applications.

By contrast, manufactured wood products and fibre cement products, for example, are generally less expensive and more versatile in their application to form different shapes and types of building elements. However, these products generally have relatively lower bending strength to weight ratio due to their inherent weakness under tensile loads. They are also generally porous and prone to some degree of moisture absorption. While in the case of fibre cement products, this does not lead to significant reductions in durability, with most materials there is usually a resultant decrease in the strength characteristics with prolonged and cyclic exposure to moisture. There is also usually a corresponding increase in mass, which may be relevant to the issue of transportation and installation.

The problem of low bending specific strength in building elements made of homogenous bonded materials such as fibre cement has been addressed to some degree by using various forms of added reinforcement. In some cases a reinforcing element is introduced into the main body of the building material during manufacture. However, this has generally required major modifications to the material manufacturing process which can be costly and may inhibit the flexibility of the manufacturing plant.

Other solutions have included the step of externally attaching some form of reinforcing element to the completed base product using fasteners or an adhesive. Examples of this concept as applied to fibre cement building substrates are described in WO 02/081842. However, in conventional production processes, this additional step is generally off line from the normal production line, requires a specific additional fastener/adhesive, is labour intensive and/or time consuming thereby adding substantially to the cost of the product.

It is an object of the invention to provide a reinforced building element, and a method and apparatus for the manufacture of such elements, which overcomes or substantially ameliorates one or more of the disadvantages of the prior art or at least provides a useful alternative.

SUMMARY OF THE INVENTION

According to a first aspect of the invention, there is provided a reinforced building element including:
 a rigid substrate having a first face; and
 a layer of reinforcing material;
 wherein said reinforcing material is adhered to said first face of said rigid substrate using a radiation curable resin.

The term "rigid" is used herein to refer to any kind of generally rigid and at least partially self supporting substrate and includes substrates that may have some degree of inherent flexibility due to their material and/or structure.

The term "radiation" is used herein to refer to radiation from U/V (ultra violet) to higher wavelengths.

According to a second aspect of the invention there is provided a method of manufacturing a reinforced building element including the steps of:
 (a) applying a radiation curable resin to a first face of a rigid substrate;
 (b) applying a reinforcing material to the layer of a radiation curable resin; and
 (c) curing the resin to thereby adhere said reinforcing material to the rigid substrate.

The radiation curable material may be undergo full curing in a single step in step c). Alternatively the radiation curable coating may be partially cured as an initial step prior to application of the reinforcing material. Preferably this initial partial curing achieves a "tackiness" suitable for initial holding and positioning on the reinforcing material.

In one embodiment, the radiation curable material is fully cured prior to application of the reinforcing material. In this embodiment, the curable material is formulated to develop on adhesive/gripping texture on curing and thereby adhere the reinforcing material.

The coating of radiation curable resin may be formed from one or more layers, preferably two layers, and the layer of reinforcing material is applied and embedded between these layers. In other words, in a particularly preferred embodiment, the radiation curable material is applied, optionally this layer undergoes a partial cure, the reinforcing material is applied over the first layer of radiation curable material, a second layer of such curable material applied, or indeed a different formulation, and the entire assembly subject to full curing.

The method may also include the further action of optionally applying several layers of radiation curable material with or without partial/full curing, prior to application of the reinforcing material.

In other variations, the partial/full curing of the radiation curable material may be applied in combination with mechanical keying by surface scuffing with equipment such as a fine sander or denibber. These intermediate steps can be repeated as desired to build up the layers of material prior to final curing step.

According to a third aspect, the present invention comprises a method of manufacturing a reinforced building element including the steps of:
 (a) combining a reinforcing material with a radiation curable resin, the quantity of resin being sufficient to adhere the reinforcing material to a rigid substrate;
 (b) applying the combined reinforcing material and resin to a first face of a rigid substrate; and
 (c) curing the resin to thereby adhere said reinforcing material to the rigid substrate.

According to a fourth aspect of the invention, there is provided an apparatus for manufacturing a reinforced building elements, the apparatus including:

means for supporting a rigid substrate such that a first face thereof is exposed;

first coating means for applying a first layer of radiation curable resin to said first face;

application means for applying a reinforcing material to said first layer of radiation curable resin; and first radiation application means for curing the applied resin.

In the preferred form, the apparatus comprises an automated system for producing a reinforced building element, the system including:

means to support a rigid substrate such that a first face thereof is exposed;

an applicator for applying a first layer of radiation curable resin to said first face of the substrate;

reinforcing feed means downstream of said applicator for feeding and applying a reinforcing material to said applied first layer of radiation curable resin; and a radiation application device for applying radiation to the applied resin, reinforcing material and substrate assembly.

Desirably the system also includes means to automatically convey the substrate downstream through the applicators/devices etc. Optionally, the mechanism may also act to support the substrate in the required orientation.

In a particularly preferred form the system further includes;

a second radiation application device located immediately downstream of the first applicator device for applying a measured dose of radiation to achieve a predetermined "tackiness" in the resin prior to the reinforcing material being applied.

The system may also include a second resin applicator downstream of the reinforcing feed means to apply a second layer of radiation curable resin on top of the reinforcing material.

In other variations, additional resin applicator devices, with or without corresponding downstream radiation application devices, may be provided upstream of the reinforcing feed means, to build up the base resin coating prior to application of the reinforcing material.

Similarly, additional resin application devices, with or without corresponding downstream radiation application devices may be provided downstream of the reinforcing feed means for implying additional building up the top sealer coatings to the element prior to final curing of the applied resin, reinforcing and substrate assembly.

Preferably the rigid substrate is a manufactured matrix material. More preferably, the material is an hydraulically or cement bound material. Most preferably the material comprises fibre reinforced cement. In one preferred embodiment, the material is cellulose fibre reinforced cement.

In the preferred form, the building element is a building sheet or panel.

In one preferred form the building element is a sheet specifically configured for use as a structural element. The structural element can be structural flooring, such as a sub-floor panel. One advantage of the fibre cement structural flooring is that it does not require a tile backerboard to adhere tiles to the structural flooring. In typical construction where it is desired to lay tile on a floor, a wood-based sub floor is first installed and then a tile backerboard is installed on top of the sub floor. The disclosed embodiments alleviate the necessity of hauling, sizing, and installing two layers of flooring prior to installing tile. In another preferred form, the building element is a sheet specifically configured for use in wet areas, such as bathrooms, laundry rooms, or kitchen areas where contact with water is possible. In a particularly preferred form, embodiments of the fibre cement sheet composition include those disclosed in U.S. Pat. No. 6,572,697 entitled "Fibre Cement Building Materials with Low Density Additives", the full contents of which are hereby expressly incorporated herein by way of cross-reference.

In addition, the preferred fibre cement sheets may be formulated according to embodiments disclosed in U.S. Pat. No. 6,346,146 entitled "Building Products" and also according to embodiments disclosed in Australian Patent No. 515151, entitled "Fibre Reinforced Cementitious Articles" the full contents of these documents being expressly incorporated herein by way of cross-reference.

Most preferably, the reinforced building element is a structural flooring sheet for use in wet areas and is configured to include connecting means in the form of grooves formed in opposite longitudinal edges of each sheet configured either to interact with corresponding tongues formed on edges of adjacent sheets or with a complimentary elongate joining member adapted for simultaneous engagement with the respective adjacent grooves of adjoining sheets. This configuration is generally used where the joint is required to span between support framing such as floor joists.

In one particular embodiment, the planks are narrow "decking" type planks, joinable by the aforementioned tongue and groove arrangement. This clearly has a significant advantage in being able to modify fibre reinforced cementitious planks for outdoor use in decking and the like.

The layer of reinforcing material can comprise any suitable continuous strand, ribbon, rod, mesh or sheet material having a higher tensile strength and similar or higher modulus of elasticity to that of the rigid substrate, where radiation curing can pass sufficiently through and/or around the material to cure the embedding sealer sufficiently to adhere the reinforcing material to the substrate. Preferably, the reinforcing material is selected such that once adhered to the substrate via the cured sealer it provides load transfer that results in an improved strength and toughness to the substrate material by greater than 5%.

Suitable reinforcing materials include fabrics made from continuous fibres such as glass fibre, alkali resistant glass fibre or carbon fibre.

The radiation curable resin can be any radiation curable material which provide efficient adherence between the fibre reinforce cement and the reinforcement materials.

The Applicant's have in fact found that radiation curable materials conventionally used as sealers for fibre reinforced cement are surprisingly useful for this purpose. Indeed they can be provided in quite low quantity, yet still act to secure the reinforcing material to the fibre reinforced cement. Further, if such a sealer is used the fibre reinforced rigid substrate is not only sealed but simultaneously, its mechanical properties are significantly improved by addition of the reinforced material.

In another embodiment, the radiation curable resin is a pressure sensitive adhesive. This embodiment is particularly useful since in some cases the reinforcing material will be applied to the rigid substrate by a roller. Applying a radiation curable pressure sensitive adhesive to the rigid substrate allows a roller to apply the fibre reinforced material with potentially less prospect of the rollers being fouled with uncured or partially cured resin.

The radiation curable resin material is preferably applied in layers from 1 to 1000 μm with 5 to 200 μm being more preferable and 10 to 120 μm being most preferred. The curable or polymerisable components used in forming the radiation curable materials and blends of the present invention include, but are not limited to, urethane, acrylic, epoxy and polyesters or compounds having multiple functional types such as polyester epoxies and urethane acrylics.

The curable or polymerisable components may be monomers, oligomers or polymers. The oligomers are prepared from a range of monomers with functionality including, but not limited to, isocyanate, hydroxyl, polyether, epoxy, carboxylic acid and ethylenic unsaturation. The monomers used in such a composite, include but are not limited to acrylate functionalised alcohols, diols and polyols, acrylate functional ethoxylated and/or propxylated alcohol, diols and polyols, and acrylate functional ethylene and propylene glycols and ethylene and propyelene polyglycols. Other monomers effective in preparing such composites include but are limited to derivatives of unsaturated carboxylic acids and diacids such as acrylate, methacryalte, maleate and fumarate esters, and vinylic functional materials such as vinyl ethers, and vinyl pyrolidones. Blends or mixtures of the polymerisable components as herein described may also be used.

It is particularly preferred to use polymerisable compounds based on including ethylenically unsaturated monomers.

It is preferable that the curable resin compositions used in the present invention have high solids content. Particularly, it is preferred if the curable resin has a solids curable polymerisable component content higher than 50%, more preferably higher than 70 and even more preferable if the resin forming compositions have a curable polymerisable content of around 80-100%. As will be clear to persons skilled in the art suitable curable resins may include pigmented systems where the pigment is a non-curable component or clear resin systems which have curable components in the greater 90% range.

It is preferable to use a combination of lower molecular weight monomers and higher molecular weight oligomers in order to achieve the most desirable viscosity for application, the best cure behaviour once exposed to radiation, and the most desirable physical and mechanical properties once cured. Lower molecular weight monomers may be present in amounts ranging from 10-50% by weight, with 10-30% being more preferable, and 15-25% being most preferred. Higher molecular weight oligomers may be present in amounts ranging from 10-50% by weight, with 15-40% being more preferable, and 20-35% being most preferred.

If filler is used, it may be present in amounts ranging from 5 to 80% by weight on the basis of the whole, whereas surface treatment additives are used in amounts ranging from 0.01 to 2% by weight, with respect to the filler, and from 0.01 to 0.5% by weight, with respect to the whole of the composition.

The above mentioned polymerisable compounds can be used as such or in mixture with additives such as catalysts, photo initiators, mineral or organic fillers, anti-wetting agents, dyes, plasticisers, pigments, stabilisers, shockproofing agents, insulating agents, flame retarding agents and the like, which are added in order to improve the physical-chemical properties of the finished product.

In some embodiments the building element has one or more additional functional surfaces to the first face, and these surfaces may also be sealed or processed in some other manner which may include lamination with other materials.

BRIEF DESCRIPTION OF THE DRAWINGS

Preferred embodiments in the invention will now be described, by way of example only, with reference to the accompanying drawings in which.

PREFERRED EMBODIMENTS OF THE INVENTION

Figure 1:
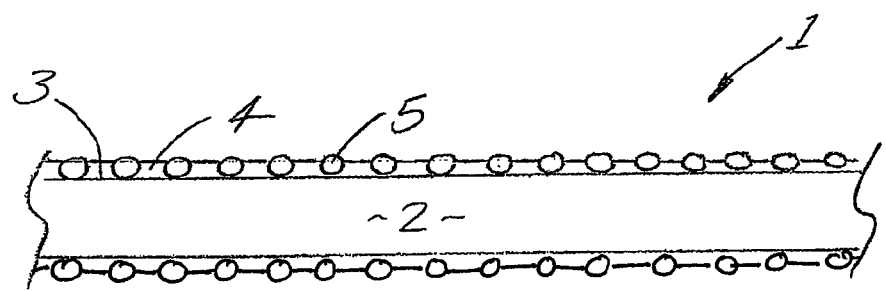
FIG. 1 is a side view of a first embodiment of a reinforced building element in accordance with the present invention.

Referring to FIG. 1, there is shown a first embodiment face sealed and reinforced building element in the form of a building sheet 1. The sheet includes a rigid substrate 2 having an upper first face 3. Applied in a first layer is a coating of radiation cured sealer 4 into which a layer of reinforcing material 5 is at least partially embedded. In the preferred form this first layer of resin 4 extends over the full area of first face 3 so as to fully seal that surface.

The building sheet 1 is manufactured by: first applying a coating of radiation curable resin to the first face 3; then applying a layer of reinforcing material 5 to the applied layer of radiation curable resin 4 such that the material is at least partially embedded therein; and then fully curing the applied sealer to adhere the material to the substrate.

As shown in FIG. 1, it is preferred that the upper surface of the reinforcing material 5 stands proud of the resin 4. Preferably the quantity of resin applied to the layer allows this to take place since it is important that rollers or other application techniques which apply the reinforcing layer to the rigid substrate are not fouled by the cured or partially cured resin 4.

In one preferred variation to this method, the applied layer of radiation curable resin 4 is first partially cured to achieve a predetermined "tackiness" in the resin so as to hold and retain the applied reinforcing material 5 prior to full curing of the resin.

Figure 2:
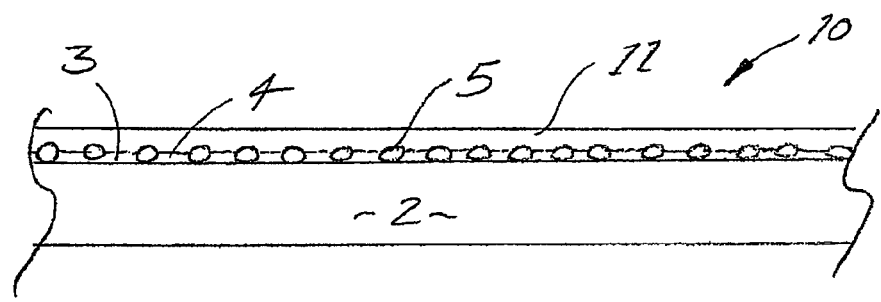
FIG. 2 is a side view of a second embodiment of a reinforced building element in accordance with the present invention.

A preferred second embodiment building sheet 10 is shown in FIG. 2. This embodiment is simply an enhancement of that shown in FIG. 1 and accordingly corresponding numerals have been used to denote corresponding features. As in FIG. 1, the building sheet 10 has a rigid substrate 2 with a first layer of curable resin 4 applied to the first surface 3. This can be done with or without partial curing of the resin prior to the layer of reinforcing material 5 being applied thereto. The main variation is that prior to full curing of the resin, a further second layer of curable resin 11 is applied on top of the applied reinforcing material 5.

Please note that in variations to both embodiments, multiple first layers of curable resin 4 can be applied, with or without partial curing, prior to application of the reinforcing material, to build up the base coating. Similarly, in the embodiment of FIG. 2, multiple further layers of curable resin 11 can be applied on top of the reinforcing material, again with or without partial curing, prior to final curing on the final assembly.

Of course other application methods and thicknesses can be used, such as by wetting the reinforcement material with resin prior to placing it in contact with the substrate. In this way, the reinforcing material sticks to the substrate without having a first base coat of resin applied to the substrate.

Subsequently, a layer of resin can be applied to encapsulate the resin and increase the bonding between the substrate and reinforcing material.

It should be noted that where multiple layers of resin are applied, it is generally preferred to at least partially cure or mechanically key an underlying layer of resin prior to a further layer being applied, as this helps both the interlayer bonding and, the application process.

This technique of several layers is useful for increasing film build and overcoming coverage problems or minimising defects in the underlying coats.

Figure 3:
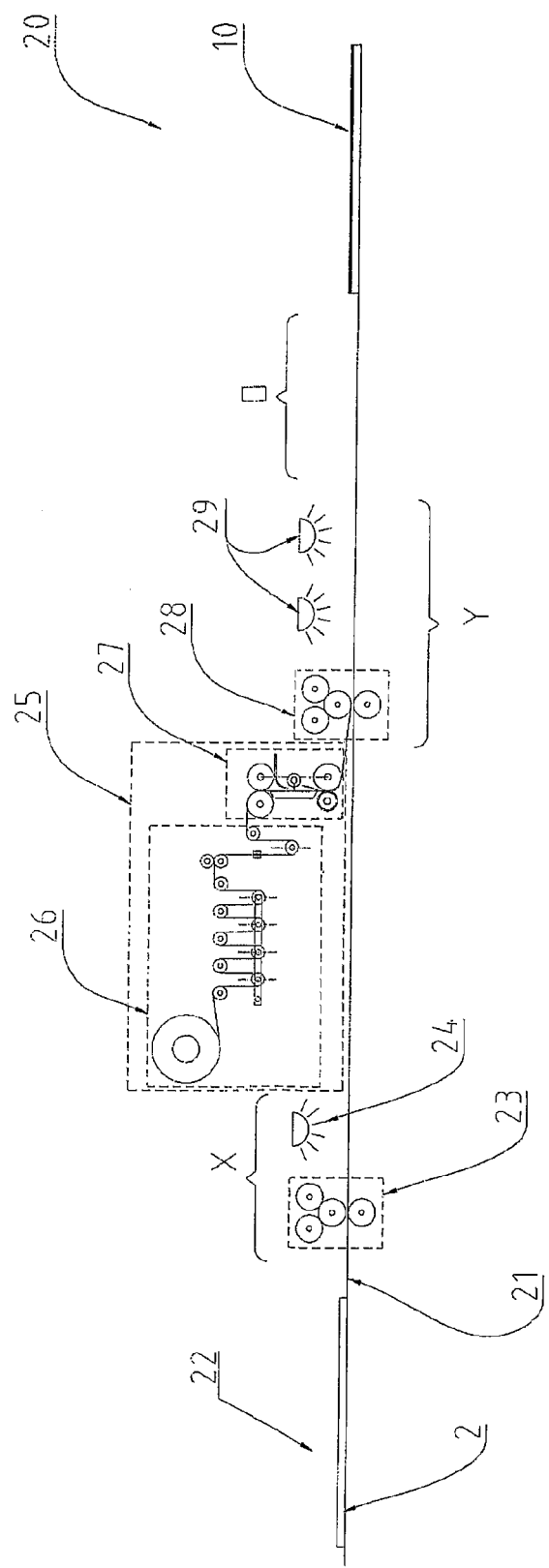
FIG. 3 is a schematic layout showing a first embodiment of an apparatus as production method in accordance with the present invention.

Referring next to FIG. 3, there is shown a schematic layout of an automated manufacturing apparatus 20 specifically configured for producing the preferred building sheet of FIG. 2.

The apparatus 20 includes a simple belt or roller conveyor 21 which serves to support the rigid substrate sheet 2 such that it's upper first face 3 is exposed and transfer the substrate in a downstream direction through the manufacturing apparatus. The conveyor 21 has a first end at a loading station 22 which is the location at which the prepared substrate sheets 2 are applied to the conveyor 21.

Immediately downstream of the loading station 22 is a first roller coating apparatus 23 for applying a first layer of radiation (preferably UV) curable resin e.g. sealer that has adjacent thereto a first radiation (preferably UV) application device 24 for optionally partially curing the sealer applied at 23.

After the radiation application device 24 a reinforcing material application device is provided as shown generally at 25. This device includes a feed attachment 26 for storing, tensioning and feeding a flexible layer of reinforcing material 5 and an application mechanism 27 which is adjustable to further control tension in the material and/or to apply pressure to push the reinforcing material onto the uncured or partially cured sealer coated substrate passing therebelow.

Downstream of the reinforcing material application device 25 is a second roller coating device or laminating device 28 for applying a second layer of radiation curable sealer on top of the applied reinforcing material 5. At the exit of this second roller coating device is one or more second radiation application devices for curing the applied radiation curable sealer.

In variations to this apparatus, the section marked X, comprising the first roller coating device 23 and first radiation application device 24, may be replicated at least once prior to the reinforcing material application device at 25. In this manner, it is possible, to build up the layer of sealer before the reinforcing material is applied. Similarly, the section Y comprising the second roller coating device and second radiation application device or devices can also be replicated to build up the sealer applied on top of the reinforcing material. Such additional units would preferably be located at position Z.

In the preferred form a clear UV curable sealer is used.

Figure 4:
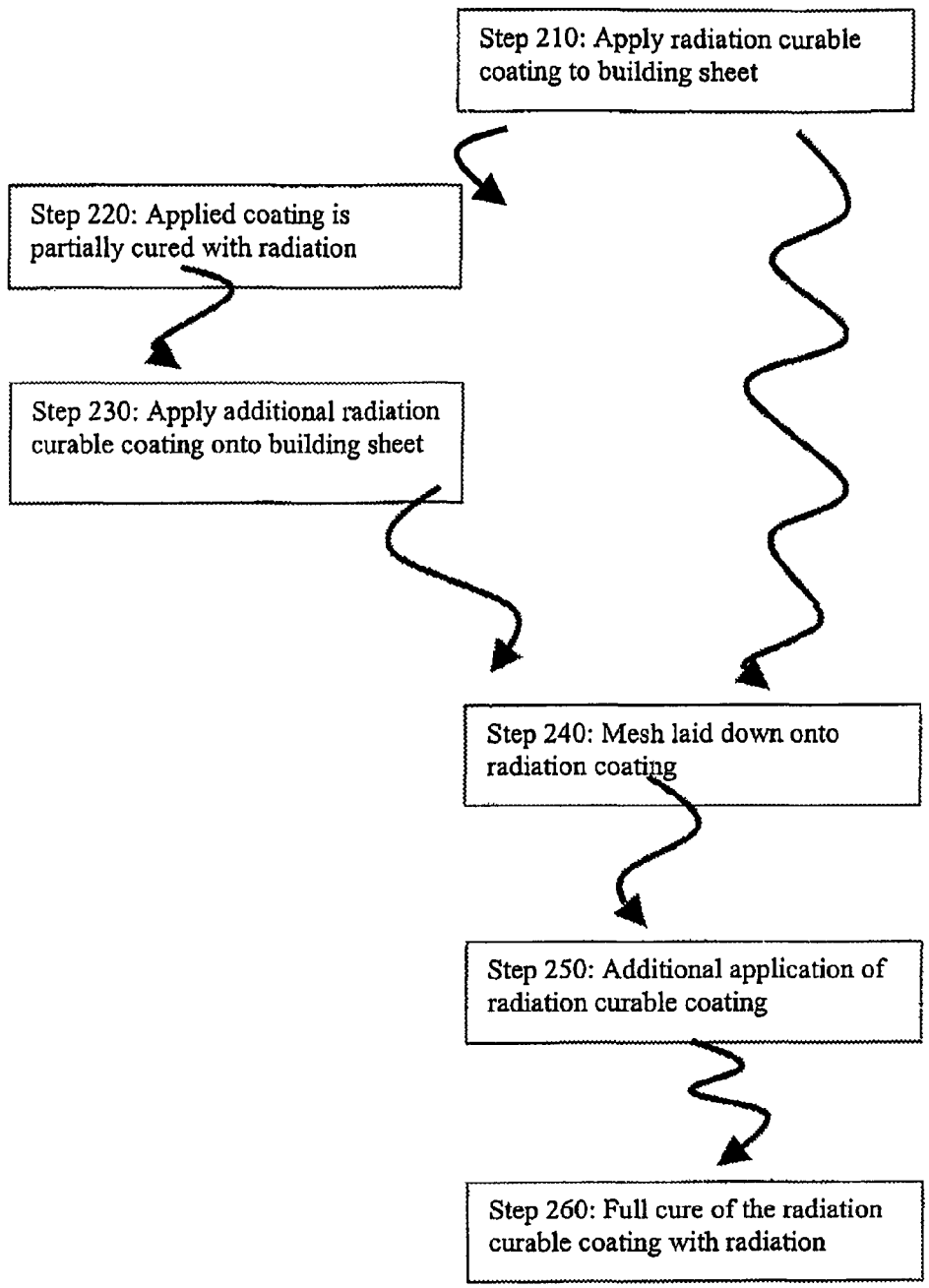
FIG. 4 is a flow chart representing a method of manufacturing according to one embodiment.

This method and some limited representative variations is summarised schematically in FIG. 4 and in the following notes.

Step 210:
In this step, a UV curable clear resin or sealer (such as that described in the example that follows) is applied onto the surface via a roller coater ensuring full coverage of the panel Step 220: [Optional]
In this step, the panel is then passed through mercury lamps at a reduced UV dosage & intensity to partially cure the UV clear resin Step 230: [Optional]
In this step, the UV clear resin is reapplied onto the panel with no UV curing Step 240:
In this step, the glass fibre mesh is layed down onto the wet or partially/gel cured resin which can be patted down or left sitting on the surface Step 250:
In this step, the panels with the glass fibre mesh passes under the roller coater where the mesh is pushed down to follow the contours of the surface & another layer of resin is applied to bind down & encapsulate the glass fibre mesh.

Step 260:
In this step, the panel passes under the UV light (at higher UV dosage & intensity) to fully cure the coating.

Further optional steps can be inserted between steps 250 and 260 to apply further coatings of UV resin which can optionally be gel cured prior to application of further coats before the final cure at step 260.

EXAMPLE

Tests were conducted on a range of samples of fibre reinforced cement flooring panels modified in accordance with the preferred form of the invention. In each case the sample was tested against the unreinforced base product.

The materials specifications and processing details for the samples made according to the invention are set out below:

| Materials | |
|---|---|
| Board Type | James Hardie ™ 19 mm AquaTec ™ wet area flooring |
| UV Sealer | UV acrylate sealer ex Akzo Nobel (860301) |
| Mesh Type | CAP80-20*20 |

Further details of the mesh are provided under the section heading Reinforcing Materials hereafter.

The flooring board panel is a medium density (approx 0.95 g/cc) cellulose fibre reinforced cement board, which for the purposes of these tests were unsealed. The control board is identified as "no mesh" in the results table. This control board has neither the radiation curable resin or mesh applied.

The board treated in accordance with the present invention is preferably sanded prior to application of the reinforcing material and radiation curable resin. Hence the apparent inconsistencies in the thickness between the control board and the treated board in the results table below.

| Processing | Parameters | Description | | | |
|---|---|---|---|---|---|
| 1 1$^{st}$ application of UV resin on board | Roller Coater Type | Sorbini T/20-M Direct Roll Coater | | | |
| | Roller Hardness | 25 Duro | | | |
| | Roller Coater Speed | 30 m/min | | | |
| | 1$^{st}$ Coat Film Build | 50-60 g/m$^2$ | | | |
| 2 Gel Cure | Lamp Type | Nordson MPS-610V CW610 Lamphead | | | |
| | UV Line Speed | 10 m/min | | | |
| | | UVA | UVB | UVC | UVV |
| | Lamp Dose 1 (J/cm$^2$) | 0.017 | 0.013 | 0.002 | 0.011 |
| 3 Mesh placement | CAP80-20*20 mesh | laid onto gel cured resin coated board then feed into the roll coater | | | |
| 4 2$^{nd}$ application of UV resin on board | Roller Coater Type | Sorbini T/20-M Direct Roll Coater | | | |
| | Roller Hardness | 25 Duro | | | |
| | Roller Coater Speed | 30 m/min | | | |
| | 2$^{nd}$ Coat Film Build | 50-60 g/m$^2$ | | | |

-continued

| Processing | Parameters | Description | | | |
|---|---|---|---|---|---|
| 5 Full Cure | Lamp Type | Nordson MPS-610V CW610 Lamphead | | | |
| | UV Line Speed | 10 m/min (x3 passes) | | | |
| | | UVA | UVB | UVC | UVV |
| | Lamp Dose 2 (J/cm$^2$) | 0.403 | 0.310 | 0.056 | 0.291 |

The samples of the invention were tested against the control samples under the following three conditions:

| Testing Conditions | |
|---|---|
| Cut Direction | Long dimension of specimen parallel with sheet long dimension |
| Equilibrium (EQ) | Equilibrium room for 72 hours |
| Oven Dried (OD) | Oven dried at 60 C. for 48 hours |
| Saturated (SAT) | Vacuum Saturated for 24 hours at −100 kPa |

Figure 5:
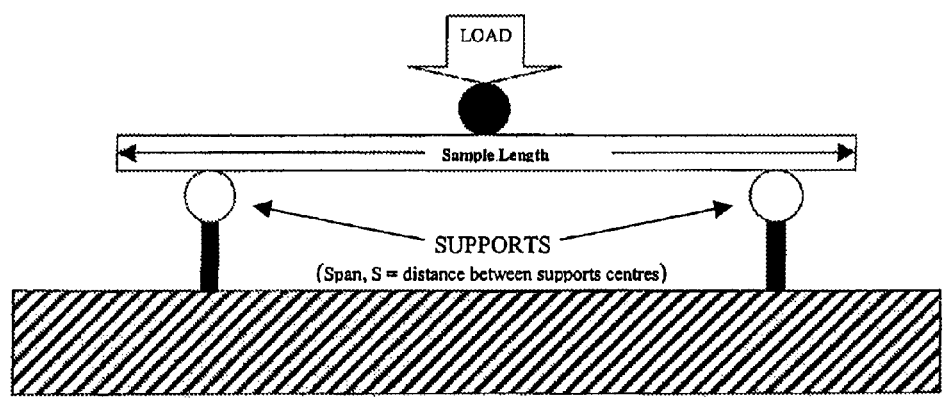
FIG. 5 is a diagram demonstrating the configuration of a test according to one embodiment.

The 3 point flexural test was used to determine the bending strength of the materials manufactured according to the methods disclosed herein. The diagram in FIG. 5 demonstrates the configuration of the test.

Samples are tested in different conditions to give the range of properties across fully saturated to fully dry. Samples taken from the examples given were tested in one or several of the conditions being saturated, equilibrium or oven dry.

Saturated Condition (SAT)

Specimens are fully immersed in water and vacuum saturated at −100 KPa for a minimum of 24 hrs in standard laboratory conditions.

Equilibrium Condition (EQ)

Specimens are conditioned in a controlled atmosphere to 23±2° C. and 50±10% humidity for 3 days minimum.

Oven Dry (OD)

Samples were conditioned in an oven set to 60±2° C. for 48 hrs minimum.

Samples are tested on a MTS Q-Test Universal Testing Machine. Specimen weight, thickness, length and width are measured before testing. The span used for testing the nominal 19 mm thick material was 360 mm. Load(N) and deflection(mm) were measured during the test until break occurred. The following calculations were used to determine the mechanical properties of the material.

Figure 6:
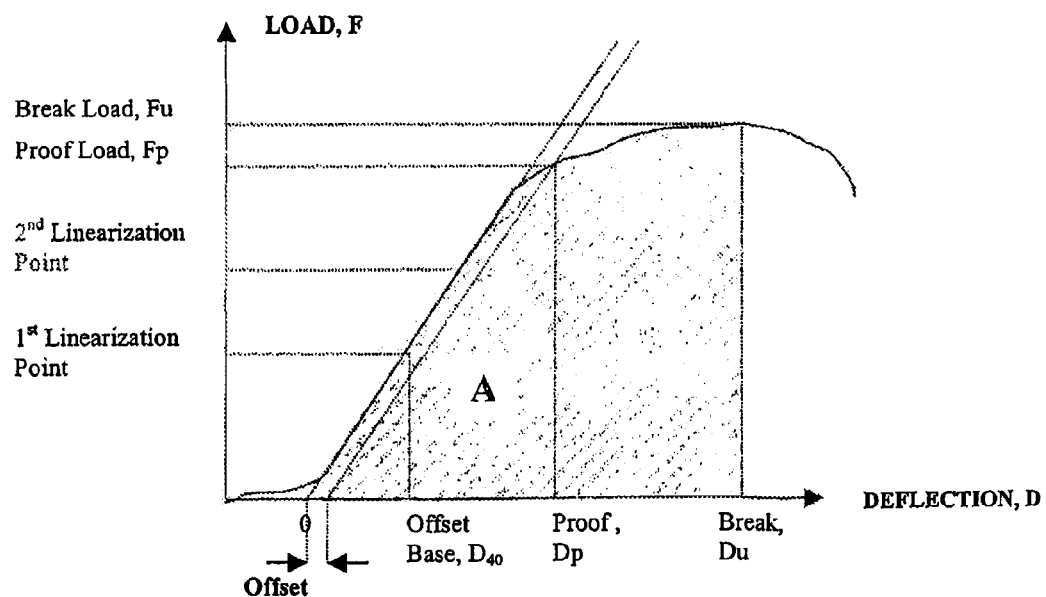
FIG. 6 is an illustration of mechanical properties of material according to one embodiment.

The data from the test was then processed to derive various mechanical properties as described below and in FIG. 6:

Break Load, Fu, is the maximum load sustained b the specimen.

Break Deflection, Du, is the deflection, corrected to zero, at which the final maximum load, Fu, was recorded (i.e. The deflection at which the break load is recorded)

Linearization Points are the points on the load deflection curve used to calculate zero deflection. Loads for the $1^{st}$ and $2^{nd}$ linearization are 40% and 60%, respectively, of the Break Load.

Zero Deflection (0) is defined by the Linearization Points from which an extrapolation is extended to zero load to determine the corresponding zero deflection.

Offset Base, $D_{40}$, is the deflection corresponding to the base load of 40% the Break Load.

Offset is the displacement of a line drawn parallel to the line through the linearization points to calculate the proof load. The offset is given as a percentage of the offset base and is 10% of $D_{40}$.

Proof Load, Fp, is equal to or above the intersection of the load deflection curve and a line drawn parallel to the linearization points but displaced by the offset deflection. The proof load may be very close to the break load in very brittle materials.

Proof Deflection, Dp, is the deflection corresponding to the proof load, Fp.

Span, S, is the distance between the centre of the supports.

Thickness, t, is the average thickness measured at 4 points spaced out evenly around the specimen.

Width, w, is the average width measured at each end of the specimen.

Mechanical Property Calculations

Modulus of Rupture (MOR) is the maximum flexural stress supported by the specimen, and can be determined according to the following formula:

$$MOR(\text{MPa}) = \frac{3FuS}{2t^2w}$$

Energy B is an estimate of the specific total energy absorbed by the specimen before breaking load. The specific total energy is proportional to the area of region B shown on the load/deflection curve. This value is obtained by integration of the area B divided by specimen volume within the test span. (kJ/m$^3$)

Strain Ultimate is the strain at breaking load and can be calculated by the following formula:

$$\text{Strain Ultimate (um/m)} = \frac{6Dut}{S^2}$$

The results are set out in the table below:

| Sample | Test Condition | Test Span mm | Strain Rate Ult Microns/ | Thickness mm | Width mm | Length mm | Mass g | Density g/cm$^3$ | Break Load N | Break Defn mm | M.O.R. MPa | Strain Ult. Micro mm/mm | Energy B Joule/m$^3$ |
|---|---|---|---|---|---|---|---|---|---|---|---|---|---|
| No mesh | EQ | 360 | 960 | 19.2 | 127.3 | 397 | 964 | 0.99 | 1258 | 6.9 | 14.5 | 6146 | 6.9 |
| Mesh CAP80 | EQ | 360 | 975 | 19.5 | 127.3 | 398 | 970 | 0.98 | 1786 | 12.7 | 19.9 | 11503 | 18.6 |
| No mesh | SAT | 360 | 1003 | 19.2 | 129.0 | 400 | 1493 | 1.51 | 810 | 13.0 | 9.2 | 11556 | 10.2 |
| Mesh CAP80 | SAT | 360 | 976 | 19.1 | 129.0 | 400 | 1469 | 1.50 | 1118 | 13.9 | 12.9 | 12304 | 12.5 |

-continued

| Sample | Test Condition | Test Span mm | Strain Rate Ult Microns/ | Thickness mm | Width mm | Length mm | Mass g | Density g/cm$^3$ | Break Load N | Break Defn mm | M.O.R. MPa | Strain Ult. Micro mm/mm | Energy B Joule/m$^3$ |
|---|---|---|---|---|---|---|---|---|---|---|---|---|---|
| No mesh | OD | 360 | 1172 | 18.9 | 130.0 | 400 | 900 | 0.92 | 1203 | 3.2 | 14.0 | 2788 | 2.4 |
| Mesh CAP80 | OD | 360 | 943 | 18.9 | 130.0 | 400 | 922 | 0.94 | 1532 | 7.1 | 17.8 | 6207 | 7.9 |

As can be seen, the sealed reinforced product has significantly improved performance in all measured properties. It can be seen in virtually all areas namely Break Load, Break, Deflection, Modulous of Rupture, Strain Ultimate and Energy B the board treated in accordance with a preferred embodiment of the present invention has significantly improved properties as compared with the control board.

Material Variations

Substrate

The rigid substrate material is preferably a moisture stable sheet material such as cellulose fibre reinforced cement of a density range from 0.80 g/cc to 1.5 g/cc. Typical materials are James Hardie™ Fibre cement internal linings, external claddings and sheet flooring. When the invention is used as a reinforced sheet structural flooring material, it is preferable to use ≥15 mm thick, nailable lower density fiber cement which is lighter weight, more workable and more nailable using conventional pneumatic and power nailing equipment than conventional compressed fibre cement products (approx. 1.6 g/cc dry density).

Preferably, the sheets must be strong enough to meet loading requirements for domestic construction flooring on supporting members spaced at 450 mm and 600 mm centres as specified, for example, in AS/NZS 1170.1:2002.

In line with the United States requirements, the supporting members need to be spaced out 16 inches, 19.2 inches and 24 inch centers in the US as specified in ASTM E330 and E661.

The preferred fibre cement sheets may be formulated according to embodiments disclosed in U.S. Pat. No. 6,346, 146 entitled "Building Products" and also according to embodiments disclosed in Australian Patent No. 515151, entitled "Fibre Reinforced Cementitious Articles" the full contents of these documents expressly incorporated herein by way of cross-reference. Most preferably, when used for structural flooring, the sheet is configured to include connecting means such as in the form of grooves formed in opposite longitudinal edges of each sheet configured either to interact with corresponding tongues formed on edges of adjacent sheets or with a complimentary elongate joining member adapted for simultaneous engagement with the respective adjacent grooves of adjoining sheets.

In general terms it is preferable for the face of the substrate to which the sealer and reinforcing is to be applied to be relatively flat. However, where this is not possible, use of a sufficiently flexible reinforcing material, along with a deformable or contoured applicating device should assist in ensuring bonding to the contoured surface.

Reinforcing Material

The reinforcing material is any continuous strand, ribbon, rod or sheet material of significantly higher strength and similar or higher modulus of elasticity to that of the substrate material where radiation curing can pass sufficiently through and/or around the material to cure the embedding resin sufficiently to adhere the reinforcing material to the sheet flooring and preferably also provide load transfer that results in an improved strength and toughness material by greater than 5%. Examples of reinforcing material are continuous fibres such as glass fibre, alkali resistant glass fibre or carbon fibre.

The reinforcing material may be coated or uncoated. In some embodiments the reinforcing material may include a coating which is compatible with the radiation curable material to assist in adherence.

The supplier of the glass fibre used in the example described above is: —
A Jiangsu Jiuding New Material Co., Ltd., No. 219 East Yuejin Road, Rugao City Jiangsu Province China. The glass fibres used were from this supplier were uncoated and coated fiberglass mesh CAP60-20*10 or polymer coated fiberglass mesh CAP80-20*20. The technica properties of this glass are listed below.

| | | Supplier Item Number | |
|---|---|---|---|
| | | CAP60-20*10 | CAP80-20*20 |
| Weave: | | Plain | Plain |
| Material (Tex): | Warp | 22*1*2 | 22*1*2 |
| | Weft | 44 | 44 |
| Density | Warp | 20 | 20 |
| (counts per inch): | Weft | 10 | 20 |
| Unit Weight | Raw | 54 ± 5 | 69 ± 5 |
| (g/m2) | Finished Product | 60 ± 5 | 80 ± 5 |
| Content of Resin: | | ≥12% | ≥14% |
| Tensile Strength | Warp | ≥650 | ≥1130 |
| (N/50 mm): | Weft | ≥650 | ≥1130 |
| Tensile strength after 28 days conditioning in 5% NaOH: | Warp | ≥60% of original | ≥60% of original |
| | Weft | ≥60% of original | ≥60% of original |

The uncoated mesh was found to be more pliant and better able to follow irregularities in the base sheet.

Radiation Curable Material

The radiation curable material, resin or sealer is applied in layers which may be from 1 to 1000 μm thick, with 5 to 200 μm being more preferable and 10 to 120 μm being most preferred. The curable or polymerisable components used in forming the radiation curable materials and blends of the present invention include, but are not limited to, urethane, acrylic, epoxy and polyesters or compounds having multiple functional types such as polyester epoxies and urethane acrylics.

The curable or polymerisable components may be monomers, oligomers or polymers. The oligomers are prepared from a range of monomers with functionality including, but not limited to, isocyanate, hydroxyl, polyether, epoxy, carboxylic acid and ethylenic unsaturation. The monomers used in such a composite, include but are not limited to acrylate functionalized alcohols, diols and polyols, acrylate functional ethoxylated and/or propxylated alcohol, diols and polyols, and acrylate functional ethylene and propylene glycols and ethylene and propyelene polyglycols. Other monomers effective in preparing such composites include but are limited to derivatives of unsaturated carboxylic acids and diacids such as acrylate, methacryalte, maleate and fumarate esters, and vinylic functional materials such as vinyl ethers, and vinyl pyrolidones. Blends or mixtures of the polymerisable components as herein described may also be used.

It is particularly preferred to use polymerisable compounds based on including ethylenically unsaturated monomers.

It is preferable that the curable resin compositions used in the present invention have high solids content. Particularly, it is preferred that the curable resin has a solids content higher than 50%, more preferably higher than 70% and even more preferable if the resin forming compositions have a solids content of around 80-100%.

It is preferable to use a combination of lower molecular weight monomers and higher molecular weight oligomers in order to achieve the most desirable viscosity for application, the best cure behaviour once exposed to radiation, and the most desirable physical and mechanical properties once cured. Lower molecular weight monomers may be present in amounts ranging from 10-50% by weight, with 10-30%-being more preferable, and 15-25% being most preferred. Higher molecular weight oligomers may be present in amounts ranging from 10-50% by weight, with 15-40% being more preferable, and 20-35% being most preferred.

If inorganic filler is used, it may be present in amounts ranging from 5 to 80% by weight on the basis of the whole, whereas surface treatment additives are preferably used in amounts ranging from 0.01 to 2% by weight, with respect to the filler, and from 0.01 to 0.5% by weight, with respect to the whole of the composition.

The above mentioned polymerisable compounds can be used as such or in mixture with additives such as catalysts, photo initiators, mineral or organic fillers, anti-wetting agents, dyes, plasticizers, pigments, stabilizers, shockproofing agents, insulating agents, flame retarding agents and the like, which are added in order to improve the physical-chemical properties of the finished product.

Examples of radiation curable material/resin/sealer:
1. A commercially available radiation curable resin such as U/V sealer: Akzo Nobel Clear Sealer R60301-001
2. A specifically formulated UV sealer such as that described in the table below:

| UV Sealer Composition | % w/w | Description | Supplier | Supplier Location |
|---|---|---|---|---|
| Tripropylene Glycol Diacrylate (TPGDA) | 20 | SR306 | Sartomer | Hong Kong, China |
| Bisphenol A Based Epoxy Acrylate | 29 | CN120 | Sartomer | Hong Kong, China |
| Anti-Settling Additive | 0.40% | Byk 410 | Byk-Chemie | Wesel, Germany |
| 2-Hydroxy-2-Methyl-1-Phenylpropan-1-one | 1.80% | Darocur 1173 | Ciba | NSW, Australia |
| 2,4,6-Trimethylbenzoyl-Diphenyl-Phosphineoxide | 1.50% | Lucirin TPO | BASF | Victoria, Australia |
| Calcium Carbonate | 46.8% | Omyacarb 20 | Omya Australia | NSW, Australia |
| Defoamer | 0.50% | Byk077 | Byk-Chemie | Wesel, Germany |

Different techniques can be used for the preparation of the composite sheets. For example, a radiation curable compound may be flood coated, roller or brush coated or spray coated onto fibre cement.

To cure a UV curable form of the resin at a film build of 40-50 gsm a UV-A dose of at least 0.15 J/cm$^2$ is required for full cure and a UV-A intensity >1 W/cm$^2$. At 60 m/minute this equates to 3 medium pressure mercury lamps running at a power input of 450 W/inch.

The preferred forms of resin/sealer are curable by V, infrared, or near infra-red.

In one example of the invention formation process, a fibre cement board is coated with a radiation curable material and a glass fibre mesh is immediately placed on top, this can then be cured with a suitable radiation source such as UV.

In another example the fibre cement board is coated with a radiation curable material which is partially radiation cured with just enough dose to create a tacky surface. A glass fibre mesh is applied to the tacky surface and a subsequent layer of radiation curable material is applied over the glass fibre mesh, and fully cured with a suitable radiation source.

In another embodiment the radiation curable material is a pressure sensitive adhesive. Such pressure sensitive adhesives which are radiation curable are known but have not been used for the purpose described. Suitable formulations include:
- a hydrogenated polybutadiene liquid oligomer (100 pts by wt) which has one or more ethylenically unsaturated terminal radicals, and a chain transfer agent (0-20 pts by wt).
- an oligomer having one or more acrylic double bonds in its molecule (100 pts by wt), a chain transfer agent (0-20 pts by wt) and an aliphatic polar monomer having a carboxyl group (0-30 pts by wt).
- poly (vinyl alkyl ether) oligomer, a liquid monoacrylate monomer and photoinitiator.
- polystyrenic block copolymers;
- epoxyfunctional liquid rubbers

METHOD OF MANUFACTURE

While the methods and apparatus detailed herein are ideally suited to achieving simultaneous sealing and reinforcing of the substrate, it will be appreciated that in the broadest form sealing of the substrate need not be achieved. Accordingly, the invention in at least one aspect is intended to include all methods by which a reinforcing material is adhered to a rigid substrate using a radiation curable resin. For example, rather than applying a full sealing coating of the resin to the substrate, a pattern of resin may be applied sufficient only to bond the reinforcing material to the substrate. Alternatively, the resin may be applied to the reinforcing material by methods such as dipping, rolling or spraying, prior to the reinforcing material being brought into bonding contact with the board. Such methods may include the steps of applying multiple layers of resin, with or without intermediate partial cure or gel cure steps along the lines outlined herein.

ADVANTAGES OF INVENTION

The invention in one of its broadest forms provides a simple but effective method of providing a building element with enhanced strength characteristics achieved by adhering a reinforcing material to a rigid substrate using a radiation curable resin. The use of a radiation curable resin as the adhesive makes the manufacturing process easy to automate as a continuous process and is readily adapted for most substrates and particularly suited for use with the preferred substrate fibre reinforced cement.

Similar advantages are obtained with that form of the invention that uses a meltable and resettable polymer solely to adhere the reinforcing material to the rigid substrate.

The invention in its preferred forms provides a very simple cost and time effective means of both sealing and simultaneously reinforcing building materials so as to improve their water resistance and strength characteristics.

This can result on the one hand, in products of only slightly increased thickness having substantially improved strength characteristics, which increases their potential range of applications, in that the products are potentially less brittle, easier to handle and more durable in terms of improved weather resistance and impact resistance.

Alternatively, the invention can be used to provide products having at least equivalent or potentially better strength characteristics to existing products, but in a form that is lighter in weight and easier to transport and handle.

The invention has particular advantages when applied to the specific field of structural flooring for use in wet area flooring and external decking. In this regard, fibre cement materials are potentially suited to such applications in terms of their durability and resistance to rot but the brittle nature of fibre cement and its reduced load bearing capabilities when wet, does in many ways limit its applications. However, as can be seen from the example above, modification of these basic flooring substrates in accordance with the invention, dramatically improves the strength characteristics of these boards. This also facilitates extended use of fibre cement products in decking applications where there may be some current resistance due to the brittleness of the base product. By having an integral reinforcing material, the product will be less prone to brittle type failure, but where this does occur the reinforcing may act to retain the fragments of the substrate in a similar manner to laminated glass products.

As mentioned above the building element of the present invention is particularly suitable for structural flooring as it does not require a tile backerboard to adhere tires to the structural flooring. Similarly, the element is suitable for external decking due to the inventive synergistic combination of moisture resistance and increased structural integrity.

The invention also allows more conventional fibre cement products to be readily adapted for use in impact resistant walling applications such as is required in hospitals and schools.

Another advantage of the invention is that the applied reinforcing helps to resist edge break out when nailing the perimeter of a building sheet, or when the fastened sheet is exposed to shear or racking forcing when fastened to framing.

It should be mentioned, that while the invention was developed primarily for use with fibre cement substrate materials, it can clearly be seen that it will have useful application with a variety of other base materials including manufactured wood, plywood etc.

Similarly, while the invention has been described in relation to the preferred application to building sheets and building panels, the invention can be applied to non-planar building elements made from similar materials such as trim components and the like, the reinforcing elements serving to increase bending strength and thereby improve handle-ability etc.

Although the invention has been described with reference to specific examples it will be appreciated by those skilled in the art that the invention may be embodied in many other forms.

The invention claimed is:

1. A reinforced building element including:
   a rigid cementitious substrate having a first face, wherein said cementitious substrate has a density range from 0.8 g/cc to 1.5 g/cc;
   a layer of ultraviolet (UV) radiation curable resin, said UV radiation curable resin is formed on the first face of the rigid cementitious substrate, said UV radiation curable resin comprising about 10 to 50% by weight of lower molecular weight monomers and about 10 to 50% by weight higher molecular weight oligomers; and
   a layer of reinforcing material having an upper surface, wherein said reinforcing material is adhered to said first face of said rigid substrate by the UV radiation curable resin which is disposed between the reinforcing material and the first face of the rigid substrate, wherein the reinforcing material is partially embedded in the layer of UV radiation curable resin in a manner such that the upper surface of the reinforcing material stands proud of the radiation curable resin, said reinforcing material having substantially the same or higher modulus of elasticity to that of the cementitious substrate such that UV radiation curing can pass sufficiently through or around the reinforcing material to cure the resin embedded therein sufficiently to adhere the reinforcing material to the cementitious substrate.

2. The reinforced building element of claim 1, wherein the rigid substrate is constructed from fibre reinforced cement.

3. The reinforced building element of claim 1, wherein the rigid substrate is a cellulose fibre reinforced cementitious article.

4. The reinforced building of claim 1, wherein the radiation curable resin covers the entire first face of the rigid substrate.

5. The reinforced building element of claim 1, wherein the radiation curable resin is provided over a portion of the first face to give sufficient adherent contact with the reinforcing material.

6. The reinforced building element of claim 1, wherein the reinforced building element comprises a further coating to cover the reinforcing material.

7. The reinforced building element of claim 1, wherein the reinforcing material is selected from the group consisting of continuous strand, ribbon, rod, mesh material, sheet material and combinations thereof.

8. The reinforced building element of claim 1, wherein the reinforcing material comprises continuous organic or inorganic fibres.

9. The reinforced building element of claim 1, wherein the reinforced building element includes an arrangement at least along its edges adapted to interlock with adjacent reinforced building elements and thereby form a panel or floor.

10. The reinforced building element of claim 1, wherein a layer of reinforcing material is provided and adhered to both the first face and a second face of the rigid substrate.

11. The reinforced building element of claim 1, wherein the radiation curable resin is a sealer.

12. The reinforced building element of claim 1, wherein the reinforced building element comprises one or more layers of radiation curable material above and below said reinforcing material.

13. A method of manufacturing a reinforced building element including the steps of:
   applying an ultraviolet (UV) radiation curable resin to a first face of a rigid cementitious substrate, said UV radiation curable resin having a high solids content and a thickness of between 1-1000 micrometers;

applying a reinforcing material to the UV radiation curable resin after the UV radiation curable resin is formed on the first surface of the rigid substrate in a manner such that the UV radiation curable resin is disposed between the reinforcing material and the first surface of the rigid substrate and the reinforcing material is partially embedded in the UV radiation curable resin such that an upper surface of the reinforcing material stands proud of the UV radiation curable resin;

curing the UV radiation curable resin to thereby adhere said reinforcing material to the rigid substrate; and wherein the steps are performed in a continuous automated process.

14. The method of claim 13 wherein the rigid substrate is constructed from fibre reinforced cement.

15. The method of claim 13, wherein the rigid substrate is a cellulose fibre reinforced cementitious article.

16. The method of claim 13, wherein the radiation curable resin is provided in a quantity sufficient to at least partially embed the reinforcing material therein.

17. The method of claim 13, wherein the radiation curable resin covers the entire first face of the rigid substrate.

18. The method of claim 13, wherein in the radiation curable resin is provided over a portion of the first face, said portion being sufficient to provide adherent contact with the reinforcing materials.

19. The method of claim 13, wherein prior to applying the reinforcing material, the radiation curable resin is at least partially cured.

20. The method of claim 13, wherein prior to applying the reinforcing material, the radiation curable resin is at least partially cured to achieve a predetermined tackiness in the resin.

21. The method of claim 13, wherein the radiation curable resin is fully cured prior to addition of the reinforced material.

22. The method of claim 13 further comprising applying one or more further coatings of radiation curable material to cover the reinforcing material.

23. The method of claim 13, wherein the radiation curable resin is applied as a series of coatings with or without partial curing there between each coating.

24. The method of claim 23, wherein the one or more further coatings of radiation curable resin are fully or partially cured in combination with mechanical keying with surface scuffing prior to application of another resin coat.

25. The method of claim 23, wherein the steps of applying are to both faces of the rigid substrate such that a layer of reinforcing material is provided and adhered to both the first face and a second face of the rigid substrate.

26. The method of claim 13, wherein the radiation curable resin is a sealer.

27. A method of manufacturing a reinforced building element including the steps of:

combining a reinforcing material with an ultraviolet (UV) radiation curable resin, the quantity of resin being sufficient to adhere the reinforcing material to a rigid cured cementitious substrate;

applying the combined reinforcing material and resin to a first face of the rigid cured substrate in a manner such that an upper surface of the reinforcing material stands proud of the UV radiation curable resin and the resin is disposed between the reinforcing material and the first face of the rigid cured substrate;

curing the resin to thereby adhere said reinforcing material to the rigid cured substrate; and applying an outer layer of UV radiation curable resin to the reinforcing material, said outer layer of UV radiation curable resin encapsulate the upper surface of the UV radiation curable resin combined with the reinforcing material.

28. The method of claim 27, wherein the rigid substrate is constructed from fibre reinforced cement.

29. The method of claim 27, wherein the rigid substrate is a cellulose fibre reinforced cementitious article.

* * * * *